US012692562B2

(12) United States Patent
Quanci et al.

(10) Patent No.: US 12,692,562 B2
(45) Date of Patent: Jul. 28, 2026

(54) FOUNDRY COKE PRODUCTS AND ASSOCIATED SYSTEMS AND PROCESSING METHODS VIA CUPOLAS

(71) Applicant: SUNCOKE TECHNOLOGY AND DEVELOPMENT LLC, Lisle, IL (US)

(72) Inventors: John Francis Quanci, Haddonfield, NJ (US); John Michael Richardson, Devon, PA (US); Jonathan Hale Perkins, Lisle, IL (US)

(73) Assignee: SUNCOKE TECHNOLOGY AND DEVELOPMENT LLC, Lisle, IL (US)

( * ) Notice: Subject to any disclaimer, the term of this patent is extended or adjusted under 35 U.S.C. 154(b) by 285 days.

(21) Appl. No.: 18/586,236

(22) Filed: Feb. 23, 2024

(65) Prior Publication Data

US 2024/0229173 A1     Jul. 11, 2024

Related U.S. Application Data

(63) Continuation of application No. 18/052,739, filed on Nov. 4, 2022, now Pat. No. 11,946,108.

(60) Provisional application No. 63/275,891, filed on Nov. 4, 2021.

(51) Int. Cl.
 *C21B 5/00* (2006.01)
 *C01B 32/40* (2017.01)
(52) U.S. Cl.
 CPC .............. *C21B 5/007* (2013.01); *C01B 32/40* (2017.08)
(58) Field of Classification Search
 CPC ..... C21B 5/007; C21B 11/02; C21B 13/0006; C21B 13/0066; C01B 32/40; C21C 1/08

USPC .......................................................... 75/503
See application file for complete search history.

(56) References Cited

U.S. PATENT DOCUMENTS

| | | | |
|---|---|---|---|
| 425,797 A | 4/1890 | Hunt | |
| 469,868 A | 3/1892 | Osbourn | |
| 705,926 A | 7/1902 | Hemingway | |
| 760,372 A | 5/1904 | Beam | |
| 845,719 A | 2/1907 | Schniewind | |

(Continued)

FOREIGN PATENT DOCUMENTS

| | | |
|---|---|---|
| CA | 1172895 | 8/1984 |
| CA | 2775992 | 5/2011 |

(Continued)

OTHER PUBLICATIONS

Chaudhari, Keval, Cupola Furnace, engineersgalary.com Jan. 24, 2016 (Year: 2016).*

(Continued)

*Primary Examiner* — Danielle M. Carda
(74) *Attorney, Agent, or Firm* — Perkins Coie LLC; Vijay S. Kumar

(57) ABSTRACT

Foundry coke products, and associated methods and systems for melting iron in a cupola furnace with the coke products are disclosed herein. A representative method can include receiving a population of coke products and iron in a cupola furnace, and melting the iron in the cupola furnace to form molten iron having a carbon content higher than a carbon content of the received iron. The coke products can comprise (i) an elongate shape including a length:width dimension of at least 1.5:1, (ii) an ash fusion temperature of no more than 2400° F., and/or (iii) a coke reactivity index (CRI) of at least 30%.

17 Claims, 16 Drawing Sheets

(56) References Cited

U.S. PATENT DOCUMENTS

| | | | |
|---|---|---|---|
| 875,989 | A | 1/1908 | Garner |
| 976,580 | A | 11/1910 | Krause |
| 1,140,798 | A | 5/1915 | Carpenter |
| 1,220,232 | A | 3/1917 | Jackson |
| 1,378,782 | A | 5/1921 | Griffin |
| 1,424,777 | A | 8/1922 | Schondeling |
| 1,429,346 | A | 9/1922 | Horn |
| 1,430,027 | A | 9/1922 | Plantinga |
| 1,486,401 | A | 3/1924 | Van Ackeren |
| 1,491,802 | A | 4/1924 | Irwin |
| 1,530,995 | A | 3/1925 | Geiger |
| 1,572,391 | A | 2/1926 | Klaiber |
| 1,676,729 | A | 7/1928 | Erwin |
| 1,677,973 | A | 7/1928 | Marquard |
| 1,705,039 | A | 3/1929 | Thornhill |
| 1,721,813 | A | 7/1929 | Geipert |
| 1,757,682 | A | 5/1930 | Palm |
| 1,818,370 | A | 8/1931 | Wine |
| 1,818,994 | A | 8/1931 | Kreisinger |
| 1,830,951 | A | 11/1931 | Lovett |
| 1,848,818 | A | 3/1932 | Becker |
| 1,895,202 | A | 1/1933 | Montgomery |
| 1,947,499 | A | 2/1934 | Schrader et al. |
| 1,955,962 | A | 4/1934 | Jones |
| 1,979,507 | A | 11/1934 | Underwood |
| 2,075,337 | A | 3/1937 | Burnaugh |
| 2,141,035 | A | 12/1938 | Daniels |
| 2,195,466 | A | 4/1940 | Otto |
| 2,235,970 | A | 3/1941 | Wilputte |
| 2,340,283 | A | 1/1944 | Vladu |
| 2,340,981 | A | 2/1944 | Otto |
| 2,343,034 | A | 2/1944 | Weber |
| 2,394,173 | A | 2/1946 | Harris et al. |
| 2,424,012 | A | 7/1947 | Bangham et al. |
| 2,486,199 | A | 10/1949 | Nier |
| 2,609,948 | A | 9/1952 | Laveley |
| 2,641,575 | A | 6/1953 | Otto |
| 2,649,978 | A | 8/1953 | Smith |
| 2,667,185 | A | 1/1954 | Beavers |
| 2,723,725 | A | 11/1955 | Keiffer |
| 2,756,842 | A | 7/1956 | Chamberlin et al. |
| 2,765,266 | A | 10/1956 | Throop et al. |
| 2,813,708 | A | 11/1957 | Frey |
| 2,827,424 | A | 3/1958 | Homan |
| 2,873,816 | A | 2/1959 | Emil et al. |
| 2,902,991 | A | 9/1959 | Whitman |
| 2,907,698 | A | 10/1959 | Schulz |
| 2,968,083 | A | 1/1961 | Lentz et al. |
| 3,010,882 | A | 11/1961 | Barclay et al. |
| 3,015,893 | A | 1/1962 | McCreary |
| 3,026,715 | A | 3/1962 | Briggs |
| 3,033,764 | A | 5/1962 | Hannes |
| 3,085,582 | A | 4/1963 | Slosman |
| 3,134,733 | A | 5/1964 | Rose |
| 3,175,961 | A | 3/1965 | Samson |
| 3,199,135 | A | 8/1965 | Trucker |
| 3,224,805 | A | 12/1965 | Clyatt |
| 3,259,551 | A | 7/1966 | Thompson, Jr. |
| 3,265,044 | A | 8/1966 | Juchtern |
| 3,267,913 | A | 8/1966 | Jakob |
| 3,327,521 | A | 6/1967 | Briggs |
| 3,342,990 | A | 9/1967 | Barrington et al. |
| 3,381,355 | A | 5/1968 | Bixby |
| 3,444,046 | A | 5/1969 | Harlow |
| 3,444,047 | A | 5/1969 | Wilde |
| 3,448,012 | A | 6/1969 | Allred |
| 3,453,839 | A | 7/1969 | Sabin |
| 3,462,345 | A | 8/1969 | Kernan |
| 3,462,346 | A | 8/1969 | Kernan et al. |
| 3,494,461 | A | 2/1970 | Fournier et al. |
| 3,511,030 | A | 5/1970 | Brown et al. |
| 3,542,650 | A | 11/1970 | Kulakov |
| 3,545,470 | A | 12/1970 | Paton |
| 3,587,198 | A | 6/1971 | Hensel |
| 3,591,827 | A | 7/1971 | Hall |
| 3,592,742 | A | 7/1971 | Thompson |
| 3,616,408 | A | 10/1971 | Hickam |
| 3,623,511 | A | 11/1971 | Levin |
| 3,630,852 | A | 12/1971 | Nashan et al. |
| 3,652,403 | A | 3/1972 | Knappstein et al. |
| 3,676,305 | A | 7/1972 | Cremer |
| 3,709,794 | A | 1/1973 | Kinzler et al. |
| 3,710,551 | A | 1/1973 | Sved |
| 3,746,626 | A | 7/1973 | Morrison, Jr. |
| 3,748,235 | A | 7/1973 | Pries |
| 3,784,034 | A | 1/1974 | Thompson |
| 3,788,236 | A | 1/1974 | Edgar et al. |
| 3,806,032 | A | 4/1974 | Pries |
| 3,811,572 | A | 5/1974 | Tatterson |
| 3,836,161 | A | 9/1974 | Buhl |
| 3,839,156 | A | 10/1974 | Jakobi et al. |
| 3,844,900 | A | 10/1974 | Schulte |
| 3,848,744 | A | 11/1974 | Flaherty |
| 3,857,758 | A | 12/1974 | Mole |
| 3,868,309 | A | 2/1975 | Sustarsic et al. |
| 3,875,016 | A | 4/1975 | Schmidt-Balve |
| 3,876,143 | A | 4/1975 | Rossow et al. |
| 3,876,506 | A | 4/1975 | Dix et al. |
| 3,878,053 | A | 4/1975 | Hyde |
| 3,894,302 | A | 7/1975 | Lasater |
| 3,897,312 | A | 7/1975 | Armour et al. |
| 3,897,313 | A | 7/1975 | Ibaragi et al. |
| 3,901,801 | A | 8/1975 | Bixby |
| 3,906,992 | A | 9/1975 | Leach |
| 3,912,091 | A | 10/1975 | Thompson |
| 3,912,597 | A | 10/1975 | MacDonald |
| 3,917,458 | A | 11/1975 | Polak |
| 3,928,144 | A | 12/1975 | Jakimowicz |
| 3,930,961 | A | 1/1976 | Sustarsic et al. |
| 3,933,443 | A | 1/1976 | Lohrmann |
| 3,957,591 | A | 5/1976 | Riecker |
| 3,959,084 | A | 5/1976 | Price |
| 3,963,582 | A | 6/1976 | Helm et al. |
| 3,969,191 | A | 7/1976 | Bollenbach |
| 3,975,148 | A | 8/1976 | Fukuda et al. |
| 3,979,870 | A | 9/1976 | Moore |
| 3,984,289 | A | 10/1976 | Sustarsic et al. |
| 3,990,948 | A | 11/1976 | Lindgren |
| 4,004,702 | A | 1/1977 | Szendroi |
| 4,004,983 | A | 1/1977 | Pries |
| 4,010,695 | A | 3/1977 | Manitone |
| 4,019,963 | A | 4/1977 | Hanley, Jr. |
| 4,025,395 | A | 5/1977 | Ekholm et al. |
| 4,040,910 | A | 8/1977 | Knappstein et al. |
| 4,045,056 | A | 8/1977 | Kandakov et al. |
| 4,045,299 | A | 8/1977 | McDonald |
| 4,059,885 | A | 11/1977 | Oldengott |
| 4,065,059 | A | 12/1977 | Jablin |
| 4,067,462 | A | 1/1978 | Thompson |
| 4,077,848 | A | 3/1978 | Grainer et al. |
| 4,083,753 | A | 4/1978 | Rogers et al. |
| 4,086,231 | A | 4/1978 | Ikio |
| 4,093,245 | A | 6/1978 | Connor |
| 4,100,033 | A | 7/1978 | Holter |
| 4,100,491 | A | 7/1978 | Newman, Jr. et al. |
| 4,100,889 | A | 7/1978 | Chayes |
| 4,111,757 | A | 9/1978 | Carimboli |
| 4,120,790 | A | 10/1978 | Tinker et al. |
| 4,124,450 | A | 11/1978 | MacDonald |
| 4,131,070 | A | 12/1978 | Jonnet |
| 4,133,720 | A | 1/1979 | Franzer et al. |
| 4,135,948 | A | 1/1979 | Mertens et al. |
| 4,135,986 | A | 1/1979 | Cain et al. |
| 4,141,299 | A | 2/1979 | Friend et al. |
| 4,141,796 | A | 2/1979 | Clark et al. |
| 4,143,104 | A | 3/1979 | van Konijnenburg et al. |
| 4,145,195 | A | 3/1979 | Knappstein et al. |
| 4,147,230 | A | 4/1979 | Ormond et al. |
| 4,162,546 | A | 7/1979 | Shortell et al. |
| 4,176,013 | A | 11/1979 | Garthus et al. |
| 4,181,459 | A | 1/1980 | Price |
| 4,189,272 | A | 2/1980 | Gregor et al. |
| 4,194,951 | A | 3/1980 | Pries |
| 4,196,053 | A | 4/1980 | Grohmann |

(56)                  References Cited

U.S. PATENT DOCUMENTS

| | | |
|---|---|---|
| 4,196,054 A | 4/1980 | Becker, Jr. et al. |
| 4,211,608 A | 7/1980 | Kwasnoski et al. |
| 4,211,611 A | 7/1980 | Bocsanczy |
| 4,213,489 A | 7/1980 | Cain |
| 4,213,827 A | 7/1980 | Calderon |
| 4,213,828 A | 7/1980 | Calderon |
| 4,222,748 A | 9/1980 | Argo et al. |
| 4,222,824 A | 9/1980 | Flockenhaus et al. |
| 4,224,109 A | 9/1980 | Flockenhaus et al. |
| 4,225,393 A | 9/1980 | Gregor et al. |
| 4,226,113 A | 10/1980 | Pelletier et al. |
| 4,230,498 A | 10/1980 | Ruecki |
| 4,235,830 A | 11/1980 | Bennett et al. |
| 4,236,998 A | 12/1980 | Heys |
| 4,239,602 A | 12/1980 | La Bate |
| 4,248,671 A | 2/1981 | Belding |
| 4,249,997 A | 2/1981 | Schmitz |
| 4,263,099 A | 4/1981 | Porter |
| 4,268,360 A | 5/1981 | Tsuzuki et al. |
| 4,271,814 A | 6/1981 | Lister |
| 4,284,478 A | 8/1981 | Brommel |
| 4,285,772 A | 8/1981 | Kress |
| 4,287,024 A | 9/1981 | Thompson |
| 4,289,479 A | 9/1981 | Johnson |
| 4,289,584 A | 9/1981 | Chuss et al. |
| 4,289,585 A | 9/1981 | Wagener et al. |
| 4,296,938 A | 10/1981 | Offermann et al. |
| 4,298,497 A | 11/1981 | Colombo |
| 4,299,666 A | 11/1981 | Ostmann |
| 4,302,935 A | 12/1981 | Cousimano |
| 4,303,615 A | 12/1981 | Jarmell et al. |
| 4,307,673 A | 12/1981 | Caughey |
| 4,312,711 A | 1/1982 | Brown et al. |
| 4,312,712 A | 1/1982 | Kwasnik et al. |
| 4,314,787 A | 2/1982 | Kwasnik et al. |
| 4,316,435 A | 2/1982 | Nagamatsu et al. |
| 4,324,568 A | 4/1982 | Wilcox et al. |
| 4,330,372 A | 5/1982 | Cairns et al. |
| 4,334,963 A | 6/1982 | Stog |
| 4,336,107 A | 6/1982 | Irwin |
| 4,336,843 A | 6/1982 | Petty |
| 4,340,445 A | 7/1982 | Kucher et al. |
| 4,342,195 A | 8/1982 | Lo |
| 4,344,820 A | 8/1982 | Thompson |
| 4,344,822 A | 8/1982 | Schwartz et al. |
| 4,353,189 A | 10/1982 | Thiersch et al. |
| 4,366,029 A | 12/1982 | Bixby et al. |
| 4,373,244 A | 2/1983 | Mertens et al. |
| 4,375,388 A | 3/1983 | Hara et al. |
| 4,385,962 A | 5/1983 | Stewen et al. |
| 4,391,674 A | 7/1983 | Velmin et al. |
| 4,392,824 A | 7/1983 | Struck et al. |
| 4,394,217 A | 7/1983 | Holz et al. |
| 4,395,269 A | 7/1983 | Schuler |
| 4,396,394 A | 8/1983 | Li et al. |
| 4,396,461 A | 8/1983 | Neubaum et al. |
| 4,406,619 A | 9/1983 | Oldengott |
| 4,407,237 A | 10/1983 | Merritt |
| 4,421,070 A | 12/1983 | Sullivan |
| 4,431,484 A | 2/1984 | Weber et al. |
| 4,439,277 A | 3/1984 | Dix |
| 4,440,098 A | 4/1984 | Adams |
| 4,441,892 A | 4/1984 | Schuster |
| 4,445,977 A | 5/1984 | Husher |
| 4,446,018 A | 5/1984 | Cerwick |
| 4,448,541 A | 5/1984 | Lucas |
| 4,452,749 A | 6/1984 | Kolvek et al. |
| 4,459,103 A | 7/1984 | Gieskieng |
| 4,469,446 A | 9/1984 | Goodboy |
| 4,474,344 A | 10/1984 | Bennett |
| 4,487,137 A | 12/1984 | Horvat et al. |
| 4,498,786 A | 2/1985 | Ruscheweyh |
| 4,506,025 A | 3/1985 | Kleeb et al. |
| 4,508,539 A | 4/1985 | Nakai |
| 4,518,461 A | 5/1985 | Gelfand |
| 4,527,488 A | 7/1985 | Lindgren |
| 4,529,407 A | 7/1985 | Johnston et al. |
| 4,564,420 A | 1/1986 | Spindeler et al. |
| 4,568,424 A | 2/1986 | Bauer |
| 4,568,426 A | 2/1986 | Orlando |
| 4,570,670 A | 2/1986 | Johnson |
| 4,614,567 A | 9/1986 | Stahlherm et al. |
| 4,643,327 A | 2/1987 | Campbell |
| 4,645,513 A | 2/1987 | Kubota et al. |
| 4,655,193 A | 4/1987 | Blacket |
| 4,655,804 A | 4/1987 | Kercheval et al. |
| 4,666,675 A | 5/1987 | Parker et al. |
| 4,680,167 A | 7/1987 | Orlando |
| 4,681,662 A | 7/1987 | Kutsumura et al. |
| 4,690,689 A | 9/1987 | Malcosky et al. |
| 4,704,195 A | 11/1987 | Janicka et al. |
| 4,720,262 A | 1/1988 | Durr et al. |
| 4,724,976 A | 2/1988 | Lee |
| 4,726,465 A | 2/1988 | Kwasnik et al. |
| 4,732,652 A | 3/1988 | Durselen et al. |
| 4,749,446 A | 6/1988 | van Laar et al. |
| 4,793,981 A | 12/1988 | Doyle et al. |
| 4,821,473 A | 4/1989 | Cowell |
| 4,822,388 A | 4/1989 | Gee |
| 4,824,614 A | 4/1989 | Jones et al. |
| 4,889,698 A | 12/1989 | Moller et al. |
| 4,898,021 A | 2/1990 | Weaver et al. |
| 4,918,975 A | 4/1990 | Voss |
| 4,919,170 A | 4/1990 | Kallinich et al. |
| 4,929,179 A | 5/1990 | Breidenbach et al. |
| 4,941,824 A | 7/1990 | Holter et al. |
| 4,981,496 A | 1/1991 | Hausslein |
| 5,013,408 A | 5/1991 | Asai et al. |
| 5,052,922 A | 10/1991 | Stokman et al. |
| 5,062,925 A | 11/1991 | Durselen et al. |
| 5,078,822 A | 1/1992 | Hodges et al. |
| 5,087,328 A | 2/1992 | Wegerer et al. |
| 5,114,542 A | 5/1992 | Childress et al. |
| 5,213,138 A | 5/1993 | Presz |
| 5,227,106 A | 7/1993 | Kolvek |
| 5,228,955 A | 7/1993 | Westbrook, III |
| 5,234,601 A | 8/1993 | Janke et al. |
| 5,318,671 A | 6/1994 | Pruitt |
| 5,370,218 A | 12/1994 | Johnson et al. |
| 5,394,600 A | 3/1995 | Chen |
| 5,398,543 A | 3/1995 | Fukushima et al. |
| 5,423,152 A | 6/1995 | Kolvek |
| 5,447,606 A | 9/1995 | Pruitt |
| 5,480,594 A | 1/1996 | Wilkerson et al. |
| 5,514,849 A | 5/1996 | Findlan et al. |
| 5,542,650 A | 8/1996 | Abel et al. |
| 5,597,452 A | 1/1997 | Hippe et al. |
| 5,603,810 A | 2/1997 | Michler |
| 5,622,280 A | 4/1997 | Mays et al. |
| 5,659,110 A | 8/1997 | Herden et al. |
| 5,670,025 A | 9/1997 | Baird |
| 5,687,768 A | 11/1997 | Albrecht et al. |
| 5,705,037 A | 1/1998 | Reinke et al. |
| 5,715,962 A | 2/1998 | McDonnell |
| 5,720,855 A | 2/1998 | Baird |
| 5,745,969 A | 5/1998 | Yamada et al. |
| 5,752,548 A | 5/1998 | Matsumoto et al. |
| 5,752,993 A | 5/1998 | Eatough et al. |
| 5,787,821 A | 8/1998 | Bhat et al. |
| 5,810,032 A | 9/1998 | Hong et al. |
| 5,816,210 A | 10/1998 | Yamaguchi |
| 5,857,308 A | 1/1999 | Dismore et al. |
| 5,881,551 A | 3/1999 | Dang |
| 5,913,448 A | 6/1999 | Mann et al. |
| 5,928,476 A | 7/1999 | Daniels |
| 5,966,886 A | 10/1999 | Di Loreto |
| 5,968,320 A | 10/1999 | Sprague |
| 6,002,993 A | 12/1999 | Naito et al. |
| 6,003,706 A | 12/1999 | Rosen |
| 6,017,214 A | 1/2000 | Sturgulewski |
| 6,022,112 A | 2/2000 | Isler et al. |
| 6,059,932 A | 5/2000 | Sturgulewski |
| 6,126,910 A | 10/2000 | Wilhelm et al. |
| 6,139,692 A | 10/2000 | Tamura et al. |

(56)                  References Cited

U.S. PATENT DOCUMENTS

| | | | |
|---|---|---|---|
| 6,152,668 | A | 11/2000 | Knoch |
| 6,156,688 | A | 12/2000 | Ando et al. |
| 6,173,679 | B1 | 1/2001 | Bruckner et al. |
| 6,187,148 | B1 | 2/2001 | Sturgulewski |
| 6,189,819 | B1 | 2/2001 | Racine |
| 6,247,231 | B1 | 6/2001 | Findlan et al. |
| 6,290,494 | B1 | 9/2001 | Barkdoll |
| 6,412,221 | B1 | 7/2002 | Emsbo |
| 6,424,457 | B1 | 7/2002 | Koonmen et al. |
| 6,495,268 | B1 | 12/2002 | Harth, III et al. |
| 6,539,602 | B1 | 4/2003 | Ozawa et al. |
| 6,596,128 | B2 | 7/2003 | Westbrook |
| 6,626,984 | B1 | 9/2003 | Taylor |
| 6,699,035 | B2 | 3/2004 | Brooker |
| 6,712,576 | B2 | 3/2004 | Skarzenski et al. |
| 6,758,875 | B2 | 7/2004 | Reid et al. |
| 6,786,941 | B2 | 9/2004 | Reeves et al. |
| 6,830,660 | B1 | 12/2004 | Yamauchi et al. |
| 6,907,895 | B2 | 6/2005 | Johnson et al. |
| 6,946,011 | B2 | 9/2005 | Snyder |
| 6,964,236 | B2 | 11/2005 | Schucker |
| 7,056,390 | B2 | 6/2006 | Fratello |
| 7,077,892 | B2 | 7/2006 | Lee |
| 7,314,060 | B2 | 1/2008 | Chen et al. |
| 7,331,298 | B2 | 2/2008 | Barkdoll et al. |
| 7,433,743 | B2 | 10/2008 | Pistikopoulos et al. |
| 7,497,930 | B2 | 3/2009 | Barkdoll et al. |
| 7,547,377 | B2 | 6/2009 | Inamasu et al. |
| 7,611,609 | B1 | 11/2009 | Valia et al. |
| 7,644,711 | B2 | 1/2010 | Creel |
| 7,722,843 | B1 | 5/2010 | Srinivasachar |
| 7,727,307 | B2 | 6/2010 | Winkler |
| 7,785,447 | B2 | 8/2010 | Eatough et al. |
| 7,803,627 | B2 | 9/2010 | Hodges et al. |
| 7,823,401 | B2 | 11/2010 | Takeuchi et al. |
| 7,827,689 | B2 | 11/2010 | Crane |
| 7,998,316 | B2 | 8/2011 | Barkdoll |
| 8,071,060 | B2 | 12/2011 | Ukai et al. |
| 8,079,751 | B2 | 12/2011 | Kapila et al. |
| 8,080,088 | B1 | 12/2011 | Srinivasachar |
| 8,146,376 | B1 | 4/2012 | Williams et al. |
| 8,152,970 | B2 | 4/2012 | Barkdoll et al. |
| 8,172,930 | B2 | 5/2012 | Barkdoll |
| 8,236,142 | B2 | 8/2012 | Westbrook |
| 8,266,853 | B2 | 9/2012 | Bloom et al. |
| 8,311,777 | B2 | 11/2012 | Suguira et al. |
| 8,383,055 | B2 | 2/2013 | Palmer |
| 8,398,935 | B2 | 3/2013 | Howell et al. |
| 8,409,405 | B2 | 4/2013 | Kim et al. |
| 8,500,881 | B2 | 8/2013 | Orita et al. |
| 8,515,508 | B2 | 8/2013 | Kawamura et al. |
| 8,568,568 | B2 | 10/2013 | Schuecker et al. |
| 8,640,635 | B2 | 2/2014 | Bloom et al. |
| 8,647,476 | B2 | 2/2014 | Kim et al. |
| 8,800,795 | B2 | 8/2014 | Hwang |
| 8,956,995 | B2 | 2/2015 | Masatsugu et al. |
| 8,980,063 | B2 | 3/2015 | Kim et al. |
| 9,039,869 | B2 | 5/2015 | Kim et al. |
| 9,057,023 | B2 | 6/2015 | Reichelt et al. |
| 9,103,234 | B2 | 8/2015 | Gu et al. |
| 9,169,439 | B2 | 10/2015 | Sarpen et al. |
| 9,193,913 | B2 | 11/2015 | Quanci et al. |
| 9,193,915 | B2 | 11/2015 | West et al. |
| 9,200,225 | B2 | 12/2015 | Barkdoll et al. |
| 9,238,778 | B2 | 1/2016 | Quanci et al. |
| 9,243,186 | B2 | 1/2016 | Quanci et al. |
| 9,249,357 | B2 | 2/2016 | Quanci et al. |
| 9,273,249 | B2 | 3/2016 | Quanci et al. |
| 9,273,250 | B2 | 3/2016 | Choi et al. |
| 9,321,965 | B2 | 4/2016 | Barkdoll |
| 9,359,554 | B2 | 6/2016 | Quanci et al. |
| 9,404,043 | B2 | 8/2016 | Kim |
| 9,463,980 | B2 | 10/2016 | Fukada et al. |
| 9,476,547 | B2 | 10/2016 | Quanci et al. |
| 9,498,786 | B2 | 11/2016 | Pearson |
| 9,580,656 | B2 | 2/2017 | Quanci et al. |
| 9,672,499 | B2 | 6/2017 | Quanci et al. |
| 9,683,740 | B2 | 6/2017 | Rodgers et al. |
| 9,708,542 | B2 | 7/2017 | Quanci et al. |
| 9,862,888 | B2 | 1/2018 | Quanci et al. |
| 9,976,089 | B2 | 5/2018 | Quanci et al. |
| 10,016,714 | B2 | 7/2018 | Quanci et al. |
| 10,041,002 | B2 | 8/2018 | Quanci et al. |
| 10,047,295 | B2 | 8/2018 | Chun et al. |
| 10,047,296 | B2 | 8/2018 | Chun et al. |
| 10,053,627 | B2 | 8/2018 | Sarpen et al. |
| 10,087,579 | B2 | 10/2018 | Ottosson et al. |
| 10,233,392 | B2 | 3/2019 | Quanci et al. |
| 10,308,876 | B2 | 6/2019 | Quanci et al. |
| 10,323,192 | B2 | 6/2019 | Quanci et al. |
| 10,392,563 | B2 | 8/2019 | Kim et al. |
| 10,435,042 | B1 | 10/2019 | Weymouth |
| 10,526,541 | B2 | 1/2020 | West et al. |
| 10,526,542 | B2 | 1/2020 | Quanci et al. |
| 10,578,521 | B1 | 3/2020 | Dinakaran et al. |
| 10,611,965 | B2 | 4/2020 | Quanci et al. |
| 10,619,101 | B2 | 4/2020 | Quanci et al. |
| 10,732,621 | B2 | 8/2020 | Cella et al. |
| 10,760,002 | B2 | 9/2020 | Ball et al. |
| 10,851,306 | B2 | 12/2020 | Crum et al. |
| 10,877,007 | B2 | 12/2020 | Steele et al. |
| 10,883,051 | B2 | 1/2021 | Quanci et al. |
| 10,920,148 | B2 | 2/2021 | Quanci et al. |
| 10,927,303 | B2 | 2/2021 | Choi et al. |
| 10,947,455 | B2 | 3/2021 | Quanci et al. |
| 10,968,393 | B2 | 4/2021 | West et al. |
| 10,968,395 | B2 | 4/2021 | Quanci et al. |
| 10,975,309 | B2 | 4/2021 | Quanci et al. |
| 10,975,310 | B2 | 4/2021 | Quanci et al. |
| 10,975,311 | B2 | 4/2021 | Quanci et al. |
| 11,008,517 | B2 | 5/2021 | Chun et al. |
| 11,008,518 | B2 | 5/2021 | Quanci |
| 11,021,655 | B2 | 6/2021 | Quanci |
| 11,053,444 | B2 | 7/2021 | Quanci et al. |
| 11,060,032 | B2 | 7/2021 | Quanci et al. |
| 11,071,935 | B2 | 7/2021 | Quanci |
| 11,098,252 | B2 | 8/2021 | Quanci |
| 11,117,087 | B2 | 9/2021 | Quanci |
| 11,142,699 | B2 | 10/2021 | West et al. |
| 11,186,778 | B2 | 11/2021 | Crum et al. |
| 11,193,069 | B2 | 12/2021 | Quanci |
| 11,214,739 | B2 | 1/2022 | Quanci et al. |
| 11,261,381 | B2 | 3/2022 | Quanci |
| 11,359,145 | B2 | 6/2022 | Ball et al. |
| 11,359,146 | B2 | 6/2022 | Quanci et al. |
| 11,365,355 | B2 | 6/2022 | Quanci |
| 11,395,989 | B2 | 7/2022 | Quanci |
| 11,441,077 | B2 | 9/2022 | Quanci et al. |
| 11,441,078 | B2 | 9/2022 | Quanci et al. |
| 11,486,572 | B2 | 11/2022 | Quanci |
| 11,505,747 | B2 | 11/2022 | Quanci et al. |
| 11,508,230 | B2 | 11/2022 | Quanci et al. |
| 11,597,881 | B2 | 3/2023 | Quanci et al. |
| 11,643,602 | B2 | 5/2023 | Quanci et al. |
| 11,680,208 | B2 | 6/2023 | Quanci et al. |
| 11,692,138 | B2 | 7/2023 | Quanci et al. |
| 11,746,296 | B2 | 9/2023 | Choi et al. |
| 11,760,937 | B2 | 9/2023 | Quanci |
| 11,767,482 | B2 | 9/2023 | Quanci et al. |
| 11,788,012 | B2 | 10/2023 | Quanci et al. |
| 11,795,400 | B2 | 10/2023 | West et al. |
| 11,807,812 | B2 | 11/2023 | Quanci et al. |
| 11,819,802 | B2 | 11/2023 | Quanci et al. |
| 11,845,037 | B2 | 12/2023 | Quanci et al. |
| 11,845,897 | B2 | 12/2023 | Quanci et al. |
| 11,845,898 | B2 | 12/2023 | Crum et al. |
| 11,851,724 | B2 | 12/2023 | Quanci et al. |
| 11,939,526 | B2 | 3/2024 | West et al. |
| 11,946,108 | B2 | 4/2024 | Quanci et al. |
| 2002/0170605 | A1 | 11/2002 | Shiraishi et al. |
| 2003/0014954 | A1 | 1/2003 | Ronning et al. |
| 2003/0015809 | A1 | 1/2003 | Carson |
| 2003/0057083 | A1 | 3/2003 | Eatough et al. |
| 2004/0016377 | A1 | 1/2004 | Johnson et al. |

(56) References Cited

U.S. PATENT DOCUMENTS

| 2004/0220840 A1 | 11/2004 | Bonissone et al. |
| 2005/0087767 A1 | 4/2005 | Fitzgerald et al. |
| 2005/0096759 A1 | 5/2005 | Benjamin et al. |
| 2006/0029532 A1 | 2/2006 | Breen et al. |
| 2006/0102420 A1 | 5/2006 | Huber et al. |
| 2006/0149407 A1 | 7/2006 | Markham et al. |
| 2007/0087946 A1 | 4/2007 | Quest et al. |
| 2007/0102278 A1 | 5/2007 | Inamasu et al. |
| 2007/0116619 A1 | 5/2007 | Taylor et al. |
| 2007/0181717 A1 | 8/2007 | Fuller |
| 2007/0251198 A1 | 11/2007 | Witter |
| 2008/0028935 A1 | 2/2008 | Andersson |
| 2008/0116052 A1 | 5/2008 | Eatough et al. |
| 2008/0179165 A1 | 7/2008 | Chen et al. |
| 2008/0250863 A1 | 10/2008 | Moore |
| 2008/0257236 A1 | 10/2008 | Green |
| 2008/0271985 A1 | 11/2008 | Yamasaki |
| 2008/0289305 A1 | 11/2008 | Girondi |
| 2009/0007785 A1 | 1/2009 | Kimura et al. |
| 2009/0032385 A1 | 2/2009 | Engle |
| 2009/0105852 A1 | 4/2009 | Wintrich et al. |
| 2009/0152092 A1 | 6/2009 | Kim et al. |
| 2009/0162269 A1 | 6/2009 | Barger et al. |
| 2009/0217576 A1 | 9/2009 | Kim et al. |
| 2009/0257932 A1 | 10/2009 | Canari et al. |
| 2009/0283395 A1 | 11/2009 | Hippe |
| 2010/0015564 A1 | 1/2010 | Chun et al. |
| 2010/0095521 A1 | 4/2010 | Kartal et al. |
| 2010/0106310 A1 | 4/2010 | Grohman |
| 2010/0113266 A1 | 5/2010 | Abe et al. |
| 2010/0115912 A1 | 5/2010 | Worley |
| 2010/0119425 A1 | 5/2010 | Palmer |
| 2010/0159247 A1 | 6/2010 | Kaya et al. |
| 2010/0181297 A1 | 7/2010 | Whysail |
| 2010/0196597 A1 | 8/2010 | Di Loreto |
| 2010/0276269 A1 | 11/2010 | Schuecker et al. |
| 2010/0287871 A1 | 11/2010 | Bloom et al. |
| 2010/0300867 A1 | 12/2010 | Kim et al. |
| 2010/0314234 A1 | 12/2010 | Knoch et al. |
| 2011/0000284 A1 | 1/2011 | Kumar et al. |
| 2011/0014406 A1 | 1/2011 | Coleman et al. |
| 2011/0048917 A1 | 3/2011 | Kim et al. |
| 2011/0083314 A1 | 4/2011 | Baird |
| 2011/0088600 A1 | 4/2011 | McRae |
| 2011/0100273 A1 | 5/2011 | Ptacek |
| 2011/0120852 A1 | 5/2011 | Kim |
| 2011/0144406 A1 | 6/2011 | Masatsugu et al. |
| 2011/0156902 A1 | 6/2011 | Wang et al. |
| 2011/0162265 A1 | 7/2011 | Krumpp et al. |
| 2011/0168482 A1 | 7/2011 | Merchant et al. |
| 2011/0174301 A1 | 7/2011 | Haydock et al. |
| 2011/0192395 A1 | 8/2011 | Kim |
| 2011/0198206 A1 | 8/2011 | Kim et al. |
| 2011/0223088 A1 | 9/2011 | Chang et al. |
| 2011/0253521 A1 | 10/2011 | Kim |
| 2011/0272508 A1 | 11/2011 | Krebs et al. |
| 2011/0291827 A1 | 12/2011 | Baldocchi et al. |
| 2011/0313218 A1 | 12/2011 | Dana |
| 2011/0315538 A1 | 12/2011 | Kim et al. |
| 2012/0031076 A1 | 2/2012 | Frank et al. |
| 2012/0125709 A1 | 5/2012 | Merchant et al. |
| 2012/0152720 A1 | 6/2012 | Reichelt et al. |
| 2012/0177541 A1 | 7/2012 | Mutsuda et al. |
| 2012/0179421 A1 | 7/2012 | Dasgupta |
| 2012/0180133 A1 | 7/2012 | Ai-Harbi et al. |
| 2012/0195815 A1 | 8/2012 | Moore et al. |
| 2012/0210635 A1 | 8/2012 | Edwards |
| 2012/0228115 A1 | 9/2012 | Westbrook |
| 2012/0247939 A1 | 10/2012 | Kim et al. |
| 2012/0285080 A1 | 11/2012 | Despen et al. |
| 2012/0305380 A1 | 12/2012 | Wang et al. |
| 2012/0312019 A1 | 12/2012 | Rechtman |
| 2013/0020781 A1 | 1/2013 | Kishikawa |
| 2013/0045149 A1 | 2/2013 | Miller |
| 2013/0213114 A1 | 8/2013 | Wetzig et al. |
| 2013/0216717 A1 | 8/2013 | Rago et al. |
| 2013/0220373 A1 | 8/2013 | Kim |
| 2013/0306462 A1 | 11/2013 | Kim et al. |
| 2014/0039833 A1 | 2/2014 | Sharpe, Jr. et al. |
| 2014/0156584 A1 | 6/2014 | Motukuri et al. |
| 2014/0208997 A1 | 7/2014 | Alferyev et al. |
| 2014/0224123 A1 | 8/2014 | Walters |
| 2014/0245803 A1 | 9/2014 | Forsythe et al. |
| 2014/0308620 A1 | 10/2014 | Deng et al. |
| 2015/0041304 A1 | 2/2015 | Kiim et al. |
| 2015/0075962 A1 | 3/2015 | Shimoyama et al. |
| 2015/0122629 A1 | 5/2015 | Freimuth et al. |
| 2015/0143908 A1 | 5/2015 | Cetinkaya |
| 2015/0175433 A1 | 6/2015 | Micka et al. |
| 2015/0176095 A1* | 6/2015 | Connors ................. C21B 5/006 |
| | | 266/47 |
| 2015/0219530 A1 | 8/2015 | Li et al. |
| 2015/0226499 A1 | 8/2015 | Mikkelsen |
| 2016/0026193 A1 | 1/2016 | Rhodes et al. |
| 2016/0048139 A1 | 2/2016 | Samples et al. |
| 2016/0149944 A1 | 5/2016 | Obermeirer et al. |
| 2016/0154171 A1 | 6/2016 | Kato et al. |
| 2016/0370082 A1 | 12/2016 | Olivo |
| 2016/0377430 A1 | 12/2016 | Kalagnanam et al. |
| 2017/0173519 A1 | 6/2017 | Naito |
| 2017/0182447 A1 | 6/2017 | Sappok et al. |
| 2017/0218274 A1 | 8/2017 | Yu et al. |
| 2017/0226425 A1 | 8/2017 | Kim et al. |
| 2017/0261417 A1 | 9/2017 | Zhang |
| 2017/0313943 A1 | 11/2017 | Valdevies |
| 2019/0317167 A1 | 10/2019 | LaBorde et al. |
| 2020/0071190 A1 | 3/2020 | Wiederin et al. |
| 2020/0139273 A1 | 5/2020 | Badiei |
| 2020/0173679 A1 | 6/2020 | O'Reilly et al. |
| 2020/0208063 A1 | 7/2020 | Quanci |
| 2021/0198579 A1 | 7/2021 | Quanci et al. |
| 2021/0261877 A1 | 8/2021 | Despen et al. |
| 2021/0340454 A1* | 11/2021 | Quanci ..................... C10L 5/04 |
| 2021/0363427 A1 | 11/2021 | Quanci et al. |
| 2022/0056342 A1 | 2/2022 | Quanci et al. |
| 2022/0228082 A1 | 7/2022 | Mennell et al. |
| 2022/0298423 A1 | 9/2022 | Quanci et al. |
| 2022/0340818 A1 | 10/2022 | Mennell et al. |
| 2022/0356410 A1 | 11/2022 | Quanci et al. |
| 2023/0258326 A1 | 8/2023 | Quanci et al. |
| 2023/0330596 A1 | 10/2023 | Bumb et al. |
| 2023/0360511 A1 | 11/2023 | Quanci et al. |
| 2023/0416629 A1 | 12/2023 | Quanci et al. |
| 2024/0059994 A1 | 2/2024 | Quanci et al. |
| 2024/0110103 A1 | 4/2024 | Quanci et al. |
| 2025/0161988 A1 | 5/2025 | Quanci |
| 2025/0163328 A1 | 5/2025 | Choi et al. |
| 2025/0163329 A1 | 5/2025 | Choi et al. |
| 2025/0163339 A1 | 5/2025 | Quanci et al. |
| 2025/0187018 A1 | 6/2025 | Quanci et al. |
| 2025/0188353 A1 | 6/2025 | Quanci et al. |
| 2025/0250489 A1 | 8/2025 | Quanci et al. |
| 2025/0263806 A1 | 8/2025 | Quanci et al. |
| 2025/0380024 A1 | 12/2025 | Quanci et al. |

FOREIGN PATENT DOCUMENTS

| CA | 2822841 | | 7/2012 |
| CA | 2822857 | | 7/2012 |
| CA | 2905110 | A1 | 9/2014 |
| CN | 87212113 | U | 6/1988 |
| CN | 87107195 | A | 7/1988 |
| CN | 2064363 | U | 10/1990 |
| CN | 2139121 | Y | 7/1993 |
| CN | 1092457 | A | 9/1994 |
| CN | 1255528 | A | 6/2000 |
| CN | 1270983 | A | 10/2000 |
| CN | 2528771 | Y | 2/2002 |
| CN | 1358822 | A | 7/2002 |
| CN | 2521473 | Y | 11/2002 |
| CN | 1425742 | A | 6/2003 |
| CN | 1468364 | A | 1/2004 |
| CN | 1527872 | A | 9/2004 |
| CN | 2668641 | | 1/2005 |

(56) References Cited

FOREIGN PATENT DOCUMENTS

| | | | |
|---|---|---|---|
| CN | 1957204 A | 5/2007 |
| CN | 101037603 A | 9/2007 |
| CN | 101058731 A | 10/2007 |
| CN | 101157874 A | 4/2008 |
| CN | 101211495 A | 7/2008 |
| CN | 201121178 Y | 9/2008 |
| CN | 101362971 A | 2/2009 |
| CN | 101395248 A | 3/2009 |
| CN | 100510004 C | 7/2009 |
| CN | 101486017 A | 7/2009 |
| CN | 201264981 Y | 7/2009 |
| CN | 101497835 A | 8/2009 |
| CN | 101509427 A | 8/2009 |
| CN | 101886466 A | 11/2010 |
| CN | 101910530 A | 12/2010 |
| CN | 101921643 A | 12/2010 |
| CN | 102072829 A | 5/2011 |
| CN | 102155300 A | 8/2011 |
| CN | 2509188 Y | 11/2011 |
| CN | 202226816 | 5/2012 |
| CN | 202265541 U | 6/2012 |
| CN | 102584294 A | 7/2012 |
| CN | 202415446 U | 9/2012 |
| CN | 202470353 U | 10/2012 |
| CN | 103399536 A | 11/2013 |
| CN | 103468289 A | 12/2013 |
| CN | 103468841 A | 12/2013 |
| CN | 103756699 A | 4/2014 |
| CN | 103913193 A | 7/2014 |
| CN | 203981700 U | 12/2014 |
| CN | 104498059 A | 4/2015 |
| CN | 104877690 A | 9/2015 |
| CN | 104915746 A | 9/2015 |
| CN | 105001914 A | 10/2015 |
| CN | 105137947 A | 12/2015 |
| CN | 105189704 A | 12/2015 |
| CN | 105264448 A | 1/2016 |
| CN | 105467949 A | 4/2016 |
| CN | 105710028 A | 6/2016 |
| CN | 105842065 A | 8/2016 |
| CN | 106399607 A | 2/2017 |
| CN | 106661456 A | 5/2017 |
| CN | 106687564 A | 5/2017 |
| CN | 107022359 A | 8/2017 |
| CN | 107267183 A | 10/2017 |
| CN | 107445633 A | 12/2017 |
| CN | 108219807 A | 6/2018 |
| CN | 105733624 B | 2/2019 |
| CN | 110141947 A | 8/2019 |
| CN | 100500619 C | 6/2020 |
| CN | 111621313 A | 9/2020 |
| CN | 111621314 A | 9/2020 |
| CN | 111778048 A | 10/2020 |
| CN | 113088310 A | 7/2021 |
| CN | 113322085 A | 8/2021 |
| CN | 113462415 A | 10/2021 |
| CN | 215964738 U | 3/2022 |
| CN | 216126086 U | 3/2022 |
| CN | 114517099 A | 5/2022 |
| CN | 101921643 B | 12/2022 |
| CN | 116606664 A | 8/2023 |
| CN | 220825067 U | 4/2024 |
| DE | 201729 C | 9/1908 |
| DE | 212176 | 7/1909 |
| DE | 1212037 B | 3/1966 |
| DE | 2212544 A | 1/1973 |
| DE | 2720688 A1 | 11/1978 |
| DE | 3231697 C1 | 1/1984 |
| DE | 3328702 A1 | 2/1984 |
| DE | 3315738 C2 | 3/1984 |
| DE | 3329367 C | 11/1984 |
| DE | 3407487 C1 | 6/1985 |
| DE | 19545736 | 6/1997 |
| DE | 19803455 | 8/1999 |
| DE | 10122531 A1 | 11/2002 |
| DE | 10154785 | 5/2003 |
| DE | 102004062936 A1 | 7/2006 |
| DE | 102005015301 | 10/2006 |
| DE | 102006004669 | 8/2007 |
| DE | 102006026521 | 12/2007 |
| DE | 102009031436 | 1/2011 |
| DE | 102011052785 | 12/2012 |
| EA | 010510 B1 | 10/2008 |
| EP | 0126399 A1 | 11/1984 |
| EP | 0208490 A1 | 1/1987 |
| EP | 0418801 A1 | 3/1991 |
| EP | 0433498 A1 | 6/1991 |
| EP | 0903393 A2 | 3/1999 |
| EP | 1538503 A1 | 6/2005 |
| EP | 1860034 A1 | 11/2007 |
| EP | 2112215 A2 | 10/2009 |
| EP | 2295129 A1 | 3/2011 |
| EP | 2468837 A1 | 6/2012 |
| FR | 2339664 | 8/1977 |
| FR | 2517802 | 6/1983 |
| FR | 2764978 | 12/1998 |
| GB | 364236 A | 1/1932 |
| GB | 368649 A | 3/1932 |
| GB | 441784 | 1/1936 |
| GB | 606340 | 8/1948 |
| GB | 611524 | 11/1948 |
| GB | 725865 | 3/1955 |
| GB | 783720 A | 9/1957 |
| GB | 871094 | 6/1961 |
| GB | 923205 A | 5/1963 |
| GB | 977905 A | 12/1964 |
| GB | 1148379 A | 4/1969 |
| GB | 2000193 A | 1/1979 |
| JP | S50148405 | 11/1975 |
| JP | S5319301 A | 2/1978 |
| JP | 54054101 | 4/1979 |
| JP | S5453103 A | 4/1979 |
| JP | 57051786 | 3/1982 |
| JP | 57051787 | 3/1982 |
| JP | 57083585 | 5/1982 |
| JP | 57090092 | 6/1982 |
| JP | S57172978 A | 10/1982 |
| JP | 58091788 | 5/1983 |
| JP | 59051978 | 3/1984 |
| JP | 59053589 | 3/1984 |
| JP | 59071388 | 4/1984 |
| JP | 59108083 | 6/1984 |
| JP | 59145281 | 8/1984 |
| JP | 60004588 | 1/1985 |
| JP | 61106690 | 5/1986 |
| JP | 62011794 | 1/1987 |
| JP | 62285980 | 12/1987 |
| JP | 01103694 | 4/1989 |
| JP | 01249886 | 10/1989 |
| JP | H0319127 | 3/1991 |
| JP | 03197588 | 8/1991 |
| JP | 04159392 | 6/1992 |
| JP | H04178494 A | 6/1992 |
| JP | H05230466 A | 9/1993 |
| JP | H0649450 A | 2/1994 |
| JP | H0654753 U | 7/1994 |
| JP | H06264062 | 9/1994 |
| JP | H06299156 A | 10/1994 |
| JP | H0776713 A | 3/1995 |
| JP | 07188668 | 7/1995 |
| JP | 07216357 | 8/1995 |
| JP | H07204432 | 8/1995 |
| JP | H07252480 A | 10/1995 |
| JP | H0843314 A | 2/1996 |
| JP | H08104875 A | 4/1996 |
| JP | 08127778 | 5/1996 |
| JP | H08218071 A | 8/1996 |
| JP | H09310074 A | 12/1997 |
| JP | H10273672 A | 10/1998 |
| JP | H11131074 | 5/1999 |
| JP | H11256166 A | 9/1999 |
| JP | 2000204373 A | 7/2000 |
| JP | 2000219883 A | 8/2000 |
| JP | 2001055576 A | 2/2001 |

(56) References Cited

FOREIGN PATENT DOCUMENTS

| JP | 2001187887 A | 7/2001 |
| JP | 2001200258 | 7/2001 |
| JP | 2002097472 A | 4/2002 |
| JP | 2002106941 | 4/2002 |
| JP | 2003041258 | 2/2003 |
| JP | 2003041618 A | 2/2003 |
| JP | 2003051082 A | 2/2003 |
| JP | 2003071313 A | 3/2003 |
| JP | 2003292968 A | 10/2003 |
| JP | 2003342581 A | 12/2003 |
| JP | 2004169016 A | 6/2004 |
| JP | 2005503448 A | 2/2005 |
| JP | 2005135422 A | 5/2005 |
| JP | 2005154597 A | 6/2005 |
| JP | 2005263983 A | 9/2005 |
| JP | 2005344085 A | 12/2005 |
| JP | 2006188608 A | 7/2006 |
| JP | 2006257252 A | 9/2006 |
| JP | 2007063420 A | 3/2007 |
| JP | 3924064 B2 | 6/2007 |
| JP | 2007169484 A | 7/2007 |
| JP | 2007231326 A | 9/2007 |
| JP | 4101226 B2 | 6/2008 |
| JP | 2008231278 A | 10/2008 |
| JP | 2009001640 A | 1/2009 |
| JP | 2009019106 A | 1/2009 |
| JP | 2009073864 A | 4/2009 |
| JP | 2009073865 A | 4/2009 |
| JP | 2009135276 A | 6/2009 |
| JP | 2009144121 A | 7/2009 |
| JP | 2009209286 A | 9/2009 |
| JP | 2010229239 A | 10/2010 |
| JP | 2010248389 A | 11/2010 |
| JP | 2011504947 A | 2/2011 |
| JP | 2011068733 A | 4/2011 |
| JP | 2011102351 A | 5/2011 |
| JP | 2012072389 A | 4/2012 |
| JP | 2012102302 A | 5/2012 |
| JP | 2012102325 A | 5/2012 |
| JP | 2013006957 A | 1/2013 |
| JP | 2013510910 A | 3/2013 |
| JP | 2013127356 A | 6/2013 |
| JP | 2013189322 A | 9/2013 |
| JP | 2014009284 A | 1/2014 |
| JP | 2014040502 A | 3/2014 |
| JP | 2015094091 A | 5/2015 |
| JP | 2015199791 A | 11/2015 |
| JP | 2016169897 A | 9/2016 |
| JP | 2020007472 A | 1/2020 |
| KR | 1019960008754 | 10/1996 |
| KR | 19990017156 U | 5/1999 |
| KR | 1019990054426 | 7/1999 |
| KR | 20000042375 A | 7/2000 |
| KR | 100296700 B1 | 10/2001 |
| KR | 20030011016 A | 2/2003 |
| KR | 20030012458 A | 2/2003 |
| KR | 1020040020883 A | 3/2004 |
| KR | 20040107204 A | 12/2004 |
| KR | 20050053861 A | 6/2005 |
| KR | 20060132336 A | 12/2006 |
| KR | 100737393 B1 | 7/2007 |
| KR | 100797852 | 1/2008 |
| KR | 20080069170 A | 7/2008 |
| KR | 20110010452 A | 2/2011 |
| KR | 101314288 | 4/2011 |
| KR | 20120033091 A | 4/2012 |
| KR | 20130050807 | 5/2013 |
| KR | 101318388 | 10/2013 |
| KR | 20140042526 A | 4/2014 |
| KR | 20140076155 A | 6/2014 |
| KR | 20150011084 A | 1/2015 |
| KR | 20150068557 A | 6/2015 |
| KR | 20170038102 A | 4/2017 |
| KR | 20170058808 A | 5/2017 |
| KR | 20170103857 A | 9/2017 |
| KR | 101862491 B1 | 5/2018 |
| KR | 102116995 B1 | 6/2020 |
| KR | 20230118420 A | 8/2023 |
| RU | 2083532 C1 | 7/1997 |
| RU | 2441898 C2 | 2/2012 |
| RU | 2493233 C2 | 9/2013 |
| RU | 2613501 C1 | 3/2017 |
| SU | 1535880 A1 | 1/1990 |
| TW | 201241166 A1 | 10/2012 |
| TW | 201245431 A1 | 11/2012 |
| UA | 50580 | 10/2002 |
| WO | WO9012074 | 10/1990 |
| WO | WO9945083 | 9/1999 |
| WO | WO02062922 | 8/2002 |
| WO | WO2003025093 | 3/2003 |
| WO | WO2005023649 | 3/2005 |
| WO | WO2005031297 | 4/2005 |
| WO | WO2005115583 | 12/2005 |
| WO | WO2007103649 | 9/2007 |
| WO | WO2008034424 | 3/2008 |
| WO | WO2008105269 | 9/2008 |
| WO | WO2009147983 | 12/2009 |
| WO | WO2010032734 | 3/2010 |
| WO | WO2010103992 | 9/2010 |
| WO | WO2011000447 | 1/2011 |
| WO | WO2011126043 | 10/2011 |
| WO | 2006010432 A1 | 3/2012 |
| WO | 2012037454 A2 | 3/2012 |
| WO | WO2012029979 | 3/2012 |
| WO | WO2012031726 | 3/2012 |
| WO | WO2013023872 | 2/2013 |
| WO | WO2010107513 | 9/2013 |
| WO | WO2013145679 | 10/2013 |
| WO | WO2013153557 | 10/2013 |
| WO | WO2014021909 | 2/2014 |
| WO | WO2014043667 | 3/2014 |
| WO | WO2014105064 | 7/2014 |
| WO | WO2014153050 | 9/2014 |
| WO | WO2016004106 | 1/2016 |
| WO | WO2016033511 | 3/2016 |
| WO | WO2016033515 | 3/2016 |
| WO | WO2016086322 | 6/2016 |
| WO | 2016109699 A1 | 7/2016 |
| WO | WO2016109854 | 7/2016 |
| WO | 2016170439 A1 | 10/2016 |
| WO | 2021225988 A1 | 11/2021 |
| WO | WO2022159604 | 7/2022 |
| WO | WO2022235839 | 11/2022 |
| WO | 2023129090 A2 | 7/2023 |

OTHER PUBLICATIONS

U.S. Appl. No. 18/321,530, filed May 22, 2023, Crum et al.
U.S. Appl. No. 18/469,704, filed Sep. 19, 2023, Crum et al.
U.S. Appl. No. 18/473,135, filed Sep. 22, 2023, Quanci et al.
U.S. Appl. No. 18/473,143, filed Sep. 22, 2023, Quanci et al.
U.S. Appl. No. 18/483,019, filed Oct. 9, 2023, West et al.
U.S. Appl. No. 18/486,021, filed Oct. 12, 2023, Quanci et al.
U.S. Appl. No. 18/492,913, filed Oct. 24, 2023, Quanci et al.
U.S. Appl. No. 18/501,488, filed Nov. 3, 2023, Quanci et al.
U.S. Appl. No. 18/501,795, filed Nov. 3, 2023, Quanci et al.
U.S. Appl. No. 18/506,616, filed Nov. 10, 2023, Quanci et al.
U.S. Appl. No. 18/506,746, filed Nov. 10, 2023, Quanci et al.
U.S. Appl. No. 18/511,148, filed Nov. 16, 2023, Quanci et al.
U.S. Appl. No. 18/511,621, filed Nov. 16, 2023, Quanci et al.
U.S. Appl. No. 18/584,320, filed Feb. 22, 2024, West et al.
"Asbestos", Virginia Department of Health, https://www.vdh.virginia.
gov/environmental-health/public-health-toxicology/asbestos/, updated
2023, 2 pages.
ASTM D5341-99(2010)e1, Standard Test Method for Measuring
Coke Reactivity Index (CRI) and Coke Strength After Reaction
(CSR), ASTM International, West Conshohocken, PA, 2010.
Astrom, et al., "Feedback Systems: An Introduction for Scientists
and Engineers," Sep. 16, 2006, available on line at http://people/
duke.edu/-hpgavin/SystemID/References/Astrom-Feedback-2006.
pdf ; 404 pages.

(56)     References Cited

OTHER PUBLICATIONS

Basset et al., "Calculation of steady flow pressure loss coefficients for pipe junctions," Proc Instn Mech Engrs., vol. 215, Part C, p. 861-881 IMechIE 2001.

Beckman et al., "Possibilities and limits of cutting back coking plant output," Stahl Und Eisen, Verlag Stahleisen, Dusseldorf, DE, vol. 130, No. 8, Aug. 16, 2010, pp. 57-67.

Bloom, et al., "Modular cast block—The future of coke oven repairs," Iron & Steel Technol, AIST, Warrendale, PA, vol. 4, No. 3, Mar. 1, 2007, pp. 61-64.

Boyes, Walt. (2003), Instrumentation Reference Book (3rd Edition)—34.7.4.6 Infrared and Thermal Cameras, Elsevier. Online version available at: https://app.knovel.com/hotlink/pdf/id:kt004QMGV6/instrumentation-reference-2/ditigal-video.

Item HT 56107 Briquette, 'H' Type Household or Domestic Use, SECV Brown Coal Mine, Yallourn, Victoria, circa 1925, Museums Victoria Collections, https://collections.museumsvictoria.com.au/items/2286568, published on Mar. 2, 2021; 3 pages.

"Ceramic fibers wool—to 1,300° C.", gTeek, Dec. 29, 2017 (date obtained from google search tools), https://www.gteek.com/ceramic-fibers-woolp-to1-300-%C2%B0C, 15 pages.

Chaudhari, K., Cupola Furnace, engineersgalary.com Jan. 24, 2016; 4 pages.

Clean coke process: process development studies by USS Engineers and Consultants, Inc., Wisconsin Tech Search, request date Oct. 5, 2011, 17 pages.

"Conveyor Chain Designer Guild", Mar. 27, 2014 (date obtained from wayback machine), Renold.com, Section 4, available online at: http://www.renold/com/upload/renoldswitzerland/conveyor_chain_-_designer_guide.pdf.

Costa, et al., "Edge Effects on the Flow Characteristics in a 90 deg Tee Junction," Transactions of the ASME, Nov. 2006, vol. 128, pp. 1204-1217.

Crelling, et al., "Effects of Weathered Coal on Coking Properties and Coke Quality", Fuel, 1979, vol. 58, Issue 7, pp. 542-546.

Database WPI, Week 199115, Thomson Scientific, Lond, GB; AN 1991-107552.

De Cordova, et al. "Coke oven life prolongation—A multidisciplinary approach." 10.5151/2594-357X-2610 (2015) 12 pages.

Diez, et al., "Coal for Metallurgical Coke Production: Predictions of Coke Quality and Future Requirements for Cokemaking", International Journal of Coal Geology, 2002, vol. 50, Issue 1-4, pp. 389-412.

"High Alumina Cement-Manufacture, Characteristics and Uses," TheConstructor.org, https://theconstructor.org/concrete/high-alumina-cement/23686/; 12 pages.

"How Glass Is Made," Corning, https://www.corning.com/worldwide/en/innovation/materials-science/glass/how-glass-made.html, 2 pages.

Industrial Furnace Design Handbook, Editor-in-Chief: First Design Institute of First Ministry of Machinery Industry, Beijing: Mechanical Industry Press, pp. 180-183, Oct. 1981.

Ishiwata, et al. "Effect of coke diameter and oxygen concentration of blast on cupola operation." ISIJ International, 2011, vol. 51, pp. 1353-1359.

Ivanova, V. A. "Analysis of the requirements for foundry coke." IOP Conference Series: Materials Science and Engineering, 2020, vol. 986, pp. 1-6.

Joseph, B., "A tutorial on inferential control and its applications," Proceedings of the 1999 American Control Conference (Cat. No. 99CH36251), San Diego, CA, 1999, pp. 3106-3118 vol. 5.

Kerlin, Thomas (1999), Practical Thermocouple Thermometry—1.1 The Thermocouple. ISA. Online version available at https:app.knovel.com/pdf/id:kt007XPTM3/practical-thermocouple/the-thermocouple.

Kochanski et al., "Overview of Uhde Heat Recovery Cokemaking Technology," AISTech Iron and Steel Technology Conference Proceedings, Association for Iron and Steel Technology, U.S., vol. 1, Jan. 1, 2005, pp. 25-32.

Knoerzer et al. "Jewell-Thompson Non-Recovery Cokemaking", Steel Times, Fuel & Metallurgical Journals Ltd. London, GB, vol. 221, No. 4, Apr. 1, 1993, pp. 172-173,184.

Kusiorowski, et al., "Thermal decomposition of different types of abestos," Journal of Thermal Analysis and Calorimetry · Feb. 2012, 109, 693-704 (2012).

Lin, Rongying et al., "Study on the synergistic effect of calcium and aluminum on improving ash fusion temperature of semi-coke," International Journal of Coal Preparation and Utilization, May 31, 2019 (published online), vol. 42, No. 3, pp. 556-564.

Lipunov, et al. "Diagnostics of the Heating Systgem and Lining of Coke Ovens," Coke and Chemistry, 2014, Vopl. 57, No. 12, pp. 489-492.

Madias, et al., "A review on stamped charging of coals" (2013). Available at https://www.researchgate.net/publication/263887759_A_review_on_stamped_charging_of_coals.

Metallurgical Coke MSDS, ArcelorMittal, May 30, 2011, available online at http://dofasco.arcelormittal.com/-/media/Files/A/Arcelormittal-Canada/material-safety/metallurgical-coke.pdf.

"Middletown Coke Company HRSG Maintenance BACT Analysis Option 1—Individual Spray Quenches Sun Heat Recovery Coke Facility Process Flow Diagram Middletown Coke Company 100 Oven Case #1-24.5 VM", (Sep. 1, 2009), URL: http://web.archive.org/web/20090901042738/http://epa.ohio.gov/portals/27/transfer/ptiApplication/mcc/new/262504.pdf, (Feb. 12, 2016), XP055249803 [X] 1-13 * p. 7 * * pp. 8-11 *.

Office of the Federal Register, National Archives and Records Administration. (Apr. 14, 2005). 70 FR 19992—National Emission Standards for Coke Oven Batteries. [Government]. Office of the Federal Register, National Archives and Records Administration. https://www.govinfo.gov/app/details/FR-2005-04-15/05-6942.

Pearson, D.E., "Influence of Geology on CSR (Coke Strength After Reaction with C02)," 2009, 8 pages.

Practical Technical Manual of Refractories, Baoyu Hu, etc., Beijing: Metallurgical Industry Press, Chapter 6; 2004, 6-30.

Powell, et al. "Cupola Furnaces", ASM International, downloaded from http://dl.asminternational.org/handbooks/edited-volume/chapter-pdf/501030/a0005197.pdf; 9 pages.

Refractories for Ironmaking and Steelmaking: A History of Battles over High Temperatures; Kyoshi Sugita (Japan, Shaolin Zhang), 1995, p. 160, 2004, 2-29.

"Refractory Castables," Victas.com, Dec. 28, 2011 (date obtained from WayBack Machine), https://www/vitcas.com/refactory-castables; 5 pages.

Rose, Harold J., "The Selection of Coals for the Manufacture of Coke," American Institute of Mining and Metallurgical Engineers, Feb. 1926, 8 pages.

Tiwari, et al., "A novel technique for assessing the coking potential of coals/cole blends for non-recovery coke making process," Fuel, vol. 107, May 2013, pp. 615-622.

Waddell, et al., "Heat-Recovery Cokemaking Presentation," Jan. 1999, pp. 1-25.

Walker D N et al, "Sun Coke Company's heat recovery cokemaking technology high coke quality and low environmental impact", Revue De Metallurgie—Cahiers D'informations Techniques, Revue De Metallurgie. Paris, FR, (20030301), vol. 100, No. 3, ISSN 0035-1563, p. 23.

Westbrook, "Heat-Recovery Cokemaking at Sun Coke," AISE Steel Technology, Pittsburg, PA, vol. 76, No. 1, Jan. 1999, pp. 25-28.

"What is dead-band control," forum post by user "wireaddict" on AllAboutCircuits.com message board, Feb. 8, 2007, accessed Oct. 24, 2018 at https://forum.allaboutcircuits.com/threads/what-is-dead-band-control.4728/; 8 pages.

Yu et al., "Coke Oven Production Technology," Lianoning Science and Technology Press, first edition, Apr. 2014, pp. 356-358.

"Resources and Utilization of Coking Coal in China," Mingxin Shen ed., Chemical Industry Press, first edition, Jan. 2007, pp. 242-243, 247.

U.S. Appl. No. 18/892,228, filed Sep. 20, 2024, Quanci et al.

Schlueter, R. "What's so good about coke made from coal, Aug. 29, 2016," Belleview News-Democrat, Rschuleter@bnd.com; 4 pages.

Seal School, Coal v. Coke|Fast differences and Comparison. Viewable on YouTube (Year:2020).

(56) References Cited

OTHER PUBLICATIONS

High Quality Qualified Customized Low Ash Sulfur Foundry Coke, Rizhaq Hengqiao Carbon Co., Ltd. 2012 (Year: 2021).
Ratanakuakangwan, S. "Comparison of metallurgical coke and ignite coke for power generation in Thailand," IOP Conference Series: Material Science Engineering, vol. 191, 012048, 2017, pp. 1-6.
U.S. Appl. No. 07/587,742, filed Sep. 25, 1990, now U.S. Pat. No. 5,114,542, titled Nonrecovery Coke Oven Battery and Method of Operation.
U.S. Appl. No. 07/878,904, filed May 6, 1992, now U.S. Pat. No. 5,318,671, titled Method of Operation of Nonrecovery Coke Oven Battery.
U.S. Appl. No. 09/783,195, filed Feb. 14, 2001, now U.S. Pat. No. 6,596,128, titled Coke Oven Flue Gas Sharing.
U.S. Appl. No. 07/886,804, filed May 22, 1992, now U.S. Pat. No. 5,228,955, titled High Strength Coke Oven Wall Having Gas Flues Therein.
U.S. Appl. No. 08/059,673, filed May 12, 1993, now U.S. Pat. No. 5,447,606, titled Method of and Apparatus for Capturing Coke Oven Charging Emissions.
U.S. Appl. No. 08/914,140, filed Aug. 19, 1997, now U.S. Pat. No. 5,928,476, titled Nonrecovery Coke Oven Door.
U.S. Appl. No. 09/680,187, filed Oct. 5, 2000, now U.S. Pat. No. 6,290,494, titled Method and Apparatus for Coal Coking.
U.S. Appl. No. 10/933,866, filed Sep. 3, 2004, now U.S. Pat. No. 7,331,298, titled Coke Oven Rotary Wedge Door Latch.
U.S. Appl. No. 11/424,566, filed Jun. 16, 2006, now U.S. Pat. No. 7,497,930, titled Method and Apparatus for Compacting Coal for a Coal Coking Process.
U.S. Appl. No. 12/405,269, filed Mar. 17, 2009, now U.S. Pat. No. 7,998,316, titled Flat Push Coke Wet Quenching Apparatus and Process.
U.S. Appl. No. 13/205,960, filed Aug. 9, 2011, now U.S. Pat. No. 9,321,965, titled Flat Push Coke Wet Quenching Apparatus and Process.
U.S. Appl. No. 11/367,236, filed Mar. 3, 2006, now U.S. Pat. No. 8,152,970, titled Method and Apparatus for Producing Coke.
U.S. Appl. No. 12/403,391, filed Mar. 13, 2009, now U.S. Pat. No. 8,172,930, titled Cleanable in Situ Spark Arrestor.
U.S. Appl. No. 12/849,192, filed Aug. 3, 2010, now U.S. Pat. No. 9,200,225, titled Method and Apparatus for Compacting Coal for a Coal Coking Process.
U.S. Appl. No. 13/631,215, filed Sep. 28, 2012, now U.S. Pat. No. 9,683,740, titled Methods for Handling Coal Processing Emissions and Associated Systems and Devices.
U.S. Appl. No. 13/730,692, filed Dec. 28, 2012, now U.S. Pat. No. 9,193,913, titled Reduced Output Rate Coke Oven Operation With Gas Sharing Providing Extended Process Cycle.
U.S. Appl. No. 14/655,204, now U.S. Pat. No. 10,016,714, filed on Jun. 24, 2015, titled Systems and Methods for Removing Mercury From Emissions.
U.S. Appl. No. 16/000,516, now U.S. Pat. No. 11,117,087, filed on Jun. 5, 2018, titled Systems and Methods for Removing Mercury From Emissions.
U.S. Appl. No. 17/459,380, now, U.S. Pat. No. 11,845,037, filed on Jun. 5, 2018, titled Systems and Methods for Removing Mercury From Emissions.
U.S. Appl. No. 18/506,616, filed Nov. 10, 2023, titled Systems and Methods for Removing Mercury From Emissions.
U.S. Appl. No. 13/830,971, filed Mar. 14, 2013, now U.S. Pat. No. 10,047,296, titled Non-Perpendicular Connections Between Coke Oven Uptakes and a Hot Common Tunnel, and Associated Systems and Methods, now U.S. Pat. No. 10,047,295.
U.S. Appl. No. 16/026,363, filed Jul. 3, 2018, now U.S. Pat. No. 11,008,517, titled Non-Perpendicular Connections Between Coke Oven Uptakes and a Hot Common Tunnel, and Associated Systems and Methods.

U.S. Appl. No. 13/730,796, filed Dec. 28, 2012, now U.S. Pat. No. 10,883,051, titled Methods and Systems for Improved Coke Quenching.
U.S. Appl. No. 17/140,564, filed Jan. 4, 2021, now U.S. Pat. No. 11,807,812, titled Methods and Systems for Improved Coke Quenching.
U.S. Appl. No. 18/473,143, filed Sep. 22, 2023, titled Methods and Systems for Improved Coke Quenching.
U.S. Appl. No. 13/730,598, filed Dec. 28, 2012, now U.S. Pat. No. 9,238,778, titled Systems and Methods for Improving Quenched Coke Recovery.
U.S. Appl. No. 14/952,267, filed Nov. 25, 2015, now U.S. Pat. No. 9,862,888, titled Systems and Methods for Improving Quenched Coke Recovery.
U.S. Appl. No. 15/830,320, filed Dec. 4, 2017, now U.S. Pat. No. 10,323,192, titled Systems and Methods for Improving Quenched Coke Recovery.
U.S. Appl. No. 13/730,735, filed Dec. 28, 2012, now U.S. Pat. No. 9,273,249, titled Systems and Methods for Controlling Air Distribution in a Coke Oven.
U.S. Appl. No. 14/655,013, filed Jun. 23, 2015, now U.S. Pat. No. 11,142,699, titled Vent Stack Lids and Associated Systems and Methods.
U.S. Appl. No. 17/471,491, filed Sep. 10, 2021, now U.S. Pat. No. 11,939,526 (Mar. 26, 2024), titled Vent Stack Lids and Associated Systems and Methods.
U.S. Appl. No. 18/584,320, filed Feb. 22, 2024, titled Vent Stack Lids and Associated Systems and Methods.
U.S. Appl. No. 13/843,166, filed Mar. 15, 2013, now U.S. Pat. No. 9,273,250, titled Methods and Systems for Improved Quench Tower Design.
U.S. Appl. No. 15/014,547, filed Feb. 3, 2016, now, U.S. Pat. No. 10,927,303, titled Methods for Improved Quench Tower Design.
U.S. Appl. No. 17/155,818, filed Jan. 22, 2021, now U.S. Pat. No. 11,746,296, titled Methods and Systems for Improved Quench Tower Design.
U.S. Appl. No. 14/655,003, filed Jun. 23, 2015, now U.S. Pat. No. 10,760,002, titled Systems and Methods for Maintaining a Hot Car in a Coke Plant.
U.S. Appl. No. 16/897,957, filed Jun. 10, 2020, now U.S. Pat. No. 11,359,145, titled Systems and Methods for Maintaining a Hot Car in a Coke Plant.
U.S. Appl. No. 13/829,588, filed Mar. 14, 2013, now U.S. Pat. No. 9,193,915, titled Horizontal Heat Recovery Coke Ovens Having Monolith Crowns.
U.S. Appl. No. 15/322,176, filed Dec. 27, 2016, now U.S. Pat. No. 10,526,541, titled Horizontal Heat Recovery Coke Ovens Having Monolith Crowns.
U.S. Appl. No. 15/511,036, filed Mar. 14, 2017, now U.S. Pat. No. 10,968,383, titled Coke Ovens Having Monolith Component Construction.
U.S. Appl. No. 17/190,720, now U.S. Pat. No. 11,795,400, filed on Mar. 3, 2021, titled Coke Ovens Having Monolith Component Construction.
U.S. Appl. No. 18/483,019, filed Oct. 9, 2023, titled Coke Ovens Having Monolith Component Construction.
U.S. Appl. No. 13/589,009, filed Aug. 17, 2012, now U.S. Pat. No. 9,359,554, titled Automatic Draft Control System for Coke Plants.
U.S. Appl. No. 15/139,568, filed Apr. 27, 2016, now U.S. Pat. No. 10,947,455, titled Automatic Draft Control System for Coke Plants.
U.S. Appl. No. 17/176,391, now U.S. Pat. No. 11,692,138, filed Feb. 16, 2021, titled Automatic Draft Control System for Coke Plants.
U.S. Appl. No. 18/321,530, filed May 22, 2023, titled Automatic Draft Control System for Coke Plants.
U.S. Appl. No. 13/588,996, filed Aug. 17, 2012, now U.S. Pat. No. 9,243,186, titled Coke Plant Including Exhaust Gas Sharing.
U.S. Appl. No. 14/959,450, filed Dec. 4, 2015, now U.S. Pat. No. 10,041,002, titled Coke Plant Including Exhaust Gas Sharing.
U.S. Appl. No. 16/047,198, filed on Jul. 27, 2018, now U.S. Pat. No. 10,611,965, titled Coke Plant Including Exhaust Gas Sharing.
U.S. Appl. No. 16/828,448, filed Mar. 24, 2020, now U.S. Pat. No. 11,441,077, titled Coke Plant Including Exhaust Gas Sharing.

(56)　　　References Cited

OTHER PUBLICATIONS

U.S. Appl. No. 13/589,004, filed Aug. 17, 2012, now U.S. Pat. No. 9,249,357, titled Method and Apparatus for Volatile Matter Sharing in Stamp-Charged Coke Ovens.
U.S. Appl. No. 13/730,673, filed Dec. 28, 2012, now U.S. Pat. No. 9,476,547, titled Exhaust Flow Modifier, Duct Intersection Incorporating the Same, and Methods Therefor.
U.S. Appl. No. 15/281,891, filed Sep. 30, 2016, now U.S. Pat. No. 10,975,309, titled Exhaust Flow Modifier, Duck Intersection Incorporating the Same, and Methods Therefor.
U.S. Appl. No. 17/191,119, filed on March 3, 3021, titled Exhaust Flow Modifier, Duck Intersection Incorporating the Same, and Methods Therefor.
U.S. Appl. No. 13/598,394, filed Aug. 29, 2012, now U.S. Pat. No. 9,169,439, titled Method and Apparatus for Testing Coal Coking Properties.
U.S. Appl. No. 14/865,581, filed Sep. 25, 2015, now U.S. Pat. No. 10,053,627, titled Method and Apparatus for Testing Coal Coking Properties, now U.S. Pat. No. 10,053,627.
U.S. Appl. No. 14/839,384, filed Aug. 28, 2015, now U.S. Pat. No. 9,580,656, titled Coke Oven Charging System.
U.S. Appl. No. 15/443,246, filed Feb. 27, 2017, now U.S. Pat. No. 9,976,089, titled Coke Oven Charging System.
U.S. Appl. No. 14/587,670, filed Dec. 31, 2014, now U.S. Pat. No. 10,619,101, titled Methods for Decarbonizing Coking Ovens, and Associated Systems and Devices.
U.S. Appl. No. 16/845,530, filed Apr. 10, 2020, now U.S. Pat. No. 11,359,146, titled Methods for Decarbonizing Coking Ovens, and Associated Systems and Devices.
U.S. Appl. No. 14/984,489, filed Dec. 30, 2015, now U.S. Pat. No. 10,975,310, titled Multi-Modal Beds of Coking Material.
U.S. Appl. No. 14/983,837, filed Dec. 30, 2015, now U.S. Pat. No. 10,968,395, titled Multi-Modal Beds of Coking Material.
U.S. Appl. No. 14/986,281, filed Dec. 31, 2015, now U.S. Pat. No. 10,975,311, titled Multi-Modal Beds of Coking Material.
U.S. Appl. No. 17/222,886, filed Apr. 12, 2021, titled Multi-Modal Beds of Coking Material.
U.S. Appl. No. 14/987,625, filed Jan. 4, 2016, now U.S. Pat. No. 11,060,032, titled Integrated Coke Plant Automation and Optimization Using Advanced Control and Optimization Techniques.
U.S. Appl. No. 17/172,476, filed Feb. 10, 2021, now U.S. Pat. No. 11,788,012, titled Integrated Coke Plant Automation and Optimization Using Advanced Control and Optimization Techniques.
U.S. Appl. No. 18/473,143, filed Sep. 22, 2023, titled Integrated Coke Plant Automation and Optimization Using Advanced Control and Optimization Techniques.
U.S. Appl. No. 14/839,493, filed Aug. 28, 2015, now U.S. Pat. No. 10,233,392, titled Method and System for Optimizing Coke Plant Operation and Output.
U.S. Appl. No. 16/251,352, filed Jan. 18, 2019, now U.S. Pat. No. 11,053,444, titled Method and System for Optimizing Coke Plant Operation and Output.
U.S. Appl. No. 14/839,551, filed Aug. 28, 2015, now U.S. Pat. No. 10,308,876, titled Burn Profiles for Coke Operations.
U.S. Appl. No. 16/428,014, filed May 31, 2019, now U.S. Pat. No. 10,920,148, titled Improved Burn Profiles for Coke Operations.
U.S. Appl. No. 17/155,719, filed Jan. 22, 2021, now U.S. Pat. No. 11,441,078, titled Improved Burn Profiles for Coke Operations.
U.S. Appl. No. 14/839,588, filed Aug. 28, 2015, now U.S. Pat. No. 9,708,542, titled Method and System for Optimizing Coke Plant Operation and Output.
U.S. Appl. No. 15/392,942, filed Dec. 28, 2016, now U.S. Pat. No. 10,526,542, titled Method and System for Dynamically Charging a Coke Oven.
U.S. Appl. No. 16/735,103, filed Jan. 6, 2020, now U.S. Pat. No. 11,214,739, titled Method and System for Dynamically Charging a Coke Oven.
U.S. Appl. No. 15/614,525, filed Jun. 5, 2017, now U.S. Pat. No. 11,508,230, titled Methods and Systems for Automatically Generating a Remedial Action in an Industrial Facility.

U.S. Appl. No. 18/047,916, filed Oct. 19, 2022, titled Methods and Systems for Automatically Generating a Remedial Action in an Industrial Facility.
U.S. Appl. No. 15/987,860, filed May 23, 2018, now U.S. Pat. No. 10,851,306, titled System and Method for Repairing a Coke Oven.
U.S. Appl. No. 17/076,563, filed Oct. 21, 2020, now U.S. Pat. No. 11,186,778, titled System and Method for Repairing a Coke Oven.
U.S. Appl. No. 17/521,061, now U.S. Pat. No. 11,845,898, filed on Nov. 8, 2021, titled System and Method for Repairing a Coke Oven.
U.S. Appl. No. 18/469,704, filed Sep. 19, 2023, titled System and Method for Repairing a Coke Oven.
U.S. Appl. No. 17/135,483, filed Dec. 28, 2020, titled Oven Health Optimization Systems and Methods.
U.S. Appl. No. 16/729,053, filed Dec. 27, 2019, now U.S. Pat. No. 11,760,937, titled Oven Uptakes.
U.S. Appl. No. 16/729,036, filed Dec. 27, 2019, now U.S. Pat. No. 11,365,355, titled Systems and Methods for Treating a Surface of a Coke Plant.
U.S. Appl. No. 17/747,708, filed May 18, 2022, titled Systems and Methods for Treating a Surface of a Coke Plant.
U.S. Appl. No. 16/729,201, filed Dec. 27, 2019, titled Gaseous Tracer Leak Detection.
U.S. Appl. No. 16/729,122, filed Dec. 27, 2019, now U.S. Pat. No. 11,395,989, titled Methods and Systems for Providing Corrosion Resistant Surfaces in Contaminant Treatment Systems.
U.S. Appl. No. 17/843,164, filed Jun. 17, 2022, now U.S. Pat. No. 11,819,802, titled Methods and Systems for Providing Corrosion Resistant Surfaces in Contaminant Treatment Systems.
U.S. Appl. No. 18/486,021, filed Oct. 12, 2023, titled Methods and Systems for Providing Corrosion Resistant Surfaces in Contaminant Treatment Systems.
U.S. Appl. No. 16/729,068, filed Dec. 27, 2019, now U.S. Pat. No. 11,486,572, titled Systems and Methods for Utilizing Flue Gas.
U.S. Appl. No. 17/947,520, filed Sep. 19, 2022, titled Systems and Methods for Utilizing Flue Gas.
U.S. Appl. No. 16/729,129, filed on Dec. 27, 2019, now U.S. Pat. No. 11,008,518, titled Coke Plant Tunnel Repair and Flexible Joints.
U.S. Appl. No. 17/320,343, filed May 14, 2021, now U.S. Pat. No. 11,597,881, titled Coke Plant Tunnel Repair and Flexible Joints.
U.S. Appl. No. 18/168,142, filed Feb. 13, 2023, titled Coke Plant Tunnel Repair and Flexible Joints.
U.S. Appl. No. 16/729,170, now U.S. Pat. No. 11,193,069, filed on Dec. 27, 2019, titled Coke Plant Tunnel Repair and Anchor Distribution.
U.S. Appl. No. 17/532,058, now U.S. Pat. No. 11,505,747, filed on Nov. 22, 2021, titled Coke Plant Tunnel Repair and Anchor Distribution.
U.S. Appl. No. 17/967,615, filed Oct. 17, 2022, titled Coke Plant Tunnel Repair and Anchor Distribution.
U.S. Appl. No. 16/729,157, filed on Dec. 27, 2019, now U.S. Pat. No. 11,071,935, titled Particulate Detection for Industrial Facilities, and Associated Systems and Methods.
U.S. Appl. No. 16/729,057, filed Dec. 27, 2019, now U.S. Pat. No. 11,021,655, titled Decarbonization of Coke Ovens and Associated Systems and Methods.
U.S. Appl. No. 17/321,857, filed May 17, 2021, now U.S. Pat. No. 11,643,602, titled Decarbonization of Coke Ovens and Associated Systems and Methods.
U.S. Appl. No. 18/313,622, filed May 8, 2023, titled Decarbonization of Coke Ovens and Associated Systems and Methods.
U.S. Appl. No. 16/729,212, filed Dec. 27, 2019, now U.S. Pat. No. 11,261,381, titled Heat Recovery Oven Foundation.
U.S. Appl. No. 17/584,672, now U.S. Pat. No. 11,845,897, filed Jan. 26, 2022, titled Heat Recovery Oven Foundation.
U.S. Appl. No. 18/492,913, filed Oct. 24, 2023, titled Heat Recovery Oven Foundation.
U.S. Appl. No. 16/729,219, now U.S. Pat. No. 11,098,252, filed on Dec. 27, 2019, titled Spring-Loaded Heat Recovery Oven System and Method.
U.S. Appl. No. 17/388,874, filed Jul. 29, 2021, now, U.S. Pat. No. 11,680,208, titled Spring-Loaded Heat Recovery Oven System and Method.

(56)          References Cited

OTHER PUBLICATIONS

U.S. Appl. No. 17/736,960, filed May 20, 2022, titled Foundry Coke Products, and Associated Systems and Methods.

U.S. Appl. No. 17/306,895, now U.S. Pat. No. 11,767,482, filed on May 3, 2021, now U.S. Pat. No. 11,767,482, titled High-Quality Coke Products.

U.S. Appl. No. 18/363,465, filed Aug. 1, 2023, titled High-Quality Coke Products.

U.S. Appl. No. 18/466,549, filed Sep. 13, 2023, titled High-Quality Coke Products.

U.S. Appl. No. 18/501,488, filed Nov. 3, 2023, titled Coal Blends, Foundry Coke Products, and Associated Systems, Devices, and Methods.

U.S. Appl. No. 18/501,795, filed Nov. 3, 2023, titled Coal Blends, Foundry Coke Products, and Associated Systems, Devices, and Methods.

U.S. Appl. No. 18/052,739, filed Nov. 4, 2022, now U.S. Pat. No. 11,946,108, titled Foundry Coke Products and Associated Processing Methods Via Cupolas.

U.S. Appl. No. 18/052,760, filed Nov. 2, 2022, now U.S. Pat. No. 11,851,724, titled Foundry Coke Products, and Associated Systems, Devices, and Methods.

U.S. Appl. No. 18/506,746, filed Nov. 10, 2023, titled Foundry Coke Products, and Associated Systems, Devices, and Methods.

U.S. Appl. No. 18/511,148, filed Nov. 16, 2023, titled Products Comprising Char and Carbon, and Associated Systems, Devices, and Methods.

U.S. Appl. No. 18/511,621, filed Nov. 16, 2023, titled Pelletized Products and Associated Systems, Devices, and Methods.

Gkotsis, et al., "Membrane-Based Technologies for Post-Combustion CO2 Capture from Flue Gases: Recent Progress in Commonly Employed Membrane Materials," Membranes 2023, 13, 898; 27 pages.

Mitsubishi Heavy Industries America, Inc., 'Development and demonstration of wasteheat integration with solvent process for more efficient CO2 removal from coal fired flue gas', 2017NETL CO2 Capture Technology Project Review Meeting, Aug. 22, 2017, pp. 1-43.

Chen, et al., "Influence of biomass addition on Jincheng coal ash fusion temperatures," Fuel, vol. 160, 2015, pp. 614-620, ISSN 0016-2361, https://doi.org/10.1016/j.fuel.2015.08.024.

Li, Y., et al. "Assessment on the effect of unburned pulverized coal on the properties of coke in blast furnace." Ironmaking & Steelmaking. 2020;47(3):228-237.

Rejdak, et al., "A Stamp-Charged Coke-Making Technology—The Effect of Charge Density and the Addition of Semi-Soft Coals on the Structural, Textural and Quality Parameters of Coke," Energies 2021, 14, 3401. https://doi.org/10.3390/en14123401.

Rejdak, et al., "Use of Alternative Raw Materials in Coke-Making: New Insights in the Use of Lignites for Blast Furnace Coke Production," Energies. 2020; 13(11):2832. https://doi.org/10.3390/en13112832.

U.S. Appl. No. 17/471,491, filed Sep. 10, 2021, now U.S. Pat. No. 11,939,526, titled Vent Stack Lids and Associated Systems and Methods.

U.S. Appl. No. 18/321,530, filed May 22, 2023, now U.S. Pat. No. 12,195,671, titled Automatic Draft Control System for Coke Plants.

U.S. Appl. No. 18/977,609, filed Dec. 11, 2024, titled Automatic Draft Control System for Coke Plants.

U.S. Appl. No. 18/047,916, filed Oct. 19, 2022, now U.S. Pat. No. 12,190,701, titled Methods and Systems for Automatically Generating a Remedial Action in an Industrial Facility.

U.S. Appl. No. 18/958,671, filed Nov. 25, 2024, titled Methods and Systems for Automatically Generating a Remedial Action in an Industrial Facility.

U.S. Appl. No. 17/135,483, filed Dec. 28, 2020, now U.S. Pat. No. 12,227,699, titled Oven Health Optimization Systems and Methods.

U.S. Appl. No. 19/054,358, filed Feb. 14, 2025, titled Oven Health Optimization Systems and Methods.

U.S. Appl. No. 17/747,708, filed May 18, 2022, now U.S. Pat. No. 12,060,525, titled Systems and Methods for Treating a Surface of a Coke Plant.

U.S. Appl. No. 18/770,264, filed Jul. 11, 2024, titled Systems and Methods for Treating a Surface of a Coke Plant.

U.S. Appl. No. 16/729,129, filed Dec. 27, 2019, now U.S. Pat. No. 11,008,518, titled Coke Plant Tunnel Repair and Flexible Joints.

U.S. Appl. No. 16/729,157, filed Dec. 27, 2019, now U.S. Pat. No. 11,071,935, titled Particulate Detection for Industrial Facilities, and Associated Systems and Methods.

U.S. Appl. No. 18/793,631, filed Aug. 2, 2024, now U.S. Pat. No. 12,215,289, titled High-Quality Coke Products.

U.S. Appl. No. 18/971,912, filed Dec. 6, 2024, titled Systems for Filtering Fines From Coke Products and Associated Devices and Methods.

U.S. Appl. No. 18/501,488, filed Nov. 3, 2023, now U.S. Pat. No. 12,110,458, titled Coal Blends, Foundry Coke Products, and Associated Systems, Devices, and Methods.

U.S. Appl. No. 18/954,859, filed Nov. 21, 2024, titled Systems, Devices and Methods for Screening Industrial Products.

U.S. Appl. No. 18/954,882, filed Nov. 21, 2024, titled Flat Push Hot Car for Foundry Coke and Associated Systems and Methods.

U.S. Appl. No. 18/892,228, filed Sep. 20, 2024, titled Foundry Coke Products, and Associated Systems, Devices, and Methods.

U.S. Appl. No. 18/955,181, filed Nov. 21, 2024, titled Emissions Recovery Systems for Industrial Facilities, and Associated Assemblies and Methods.

U.S. Appl. No. 18/972,005, filed Dec. 6, 2024, titled Milling Systems and Methods for Producing Materials With a Particular Particle Size Distribution.

U.S. Appl. No. 18/971,647, filed Dec. 6, 2024, titled Systems and Methods for Capturing Greenhouse Gases From Coke Production Facilities.

U.S. Appl. No. 18/949,426, filed Nov. 15, 2024, titled Pelletized Products and Associated Systems, Devices and Methods.

Chiu, et al., "Coke reactivity—Effect of Fe2O3 and K2CO3 addition to the coal charge before carbonization", Fuel, IPC Science and Technology Press, Guildford, GB, vol. 64, No. 7, Jul. 1, 1985 (Jul. 1, 1985), pp. 1007-1010.

Flores, et al., "How coke optical texture became a relevant tool for understanding coal blending and coke quality", Fuel Processing Technology, Elsevier BV, NL, vol. 164, Apr. 29, 2017 (Apr. 29, 2017), pp. 13-23.

Ulanovskii, et al., "Influence of the mineral components of coal on coke quality (CRI and CRS)", Coke and Chemistry, vol. 50, No. 4, Apr. 1, 2007 (Apr. 1, 2007), pp. 94-98.

U.S. Appl. No. 18/770,274, filed Jul. 11, 2024, Quanci et al.

U.S. Appl. No. 18/793,631, filed Aug. 2, 2024, Quanci et al.

* cited by examiner

400

412

414

416

450

| | Batch 1 | Batch 2 | Batch 3 | Batch 4 | Batch 4 (production |
|---|---|---|---|---|---|
| Total Ash (wt %) | 9.54 | 8.79 | 8.45 | 8.13 | 8.04 |
| Ash Fusion IDT (°F) | N/A | 2420 | 2370 | 2233 | 2150 |
| Ash Fusion ST (°F) | N/A | 2500 | 2510 | 2377 | 2370 |
| $Al_2O_3$ in Coal Blend Ash Composition (wt %) | 28.5 | 26.3 | 26.1 | 24.9 | 24.1 |
| $SiO_2$ in Coal Blend Ash Composition (wt %) | 49.4 | 48.9 | 48.8 | 49.1 | 46.0 |
| Ash Fusion (calculated by Formula (IA) or (IB)) | 2604 | 2544 | 2517 | 2494 | 2408 |
| CRI (wt %) | 30 | 36 | 32 | 36.5 | 35.5 |
| CSR (wt %) | 41 | 16 | 26 | 15.3 | 15.6 |

Ash Softening Temperature vs. Model Ash Fusion Temperature

FOUNDRY COKE PRODUCTS AND ASSOCIATED SYSTEMS AND PROCESSING METHODS VIA CUPOLAS

CROSS-REFERENCE TO RELATED APPLICATIONS

The present application is a continuation of U.S. patent application Ser. No. 18/052,739, filed Nov. 4, 2022, which claims the benefit of priority to U.S. Provisional Patent Application No. 63/275,891, filed Nov. 4, 2021, the disclosures of which are incorporated herein by reference in their entireties. The present application relates to U.S. patent application Ser. No. 18/052,760, filed Nov. 4, 2022, now U.S. Pat. No. 11,851,724, titled FOUNDRY COKE PRODUCTS, AND ASSOCIATED SYSTEMS, DEVICES, AND METHODS, the disclosure of which is incorporated herein by reference in its entirety.

TECHNICAL FIELD

This present technology relates to foundry coke products, and associated systems and processing methods via cupolas.

BACKGROUND

Coke can be divided into various subcategories. Foundry coke has a large size relative to blast coke and is of exceptional quality, including relatively low impurities, and relatively high carbon content, strength, and stability. Foundry coke is used in foundry cupolas to melt iron and produce cast iron and ductile iron products. However, the production cost, including the manufacturing cost, transportation cost, and environmental cost, for foundry coke is high. Additionally, conventional coke products can have characteristics that result in undesirable processing conditions within a cupola. For example, conventional coke products may undergo oxidation and/or combustion reactions at areas of the cupola that limit transfer of the carbon content from the coke products to molten iron within cupolas. This decreased efficiency increases the amount of coke products needed to produce iron product and costs for iron producers. Therefore, there is a need to produce a higher quality foundry coke product.

BRIEF DESCRIPTION OF THE DRAWINGS

Features, aspects, and advantages of the presently disclosed technology may be better understood with regard to the following drawings.

Figure 1:
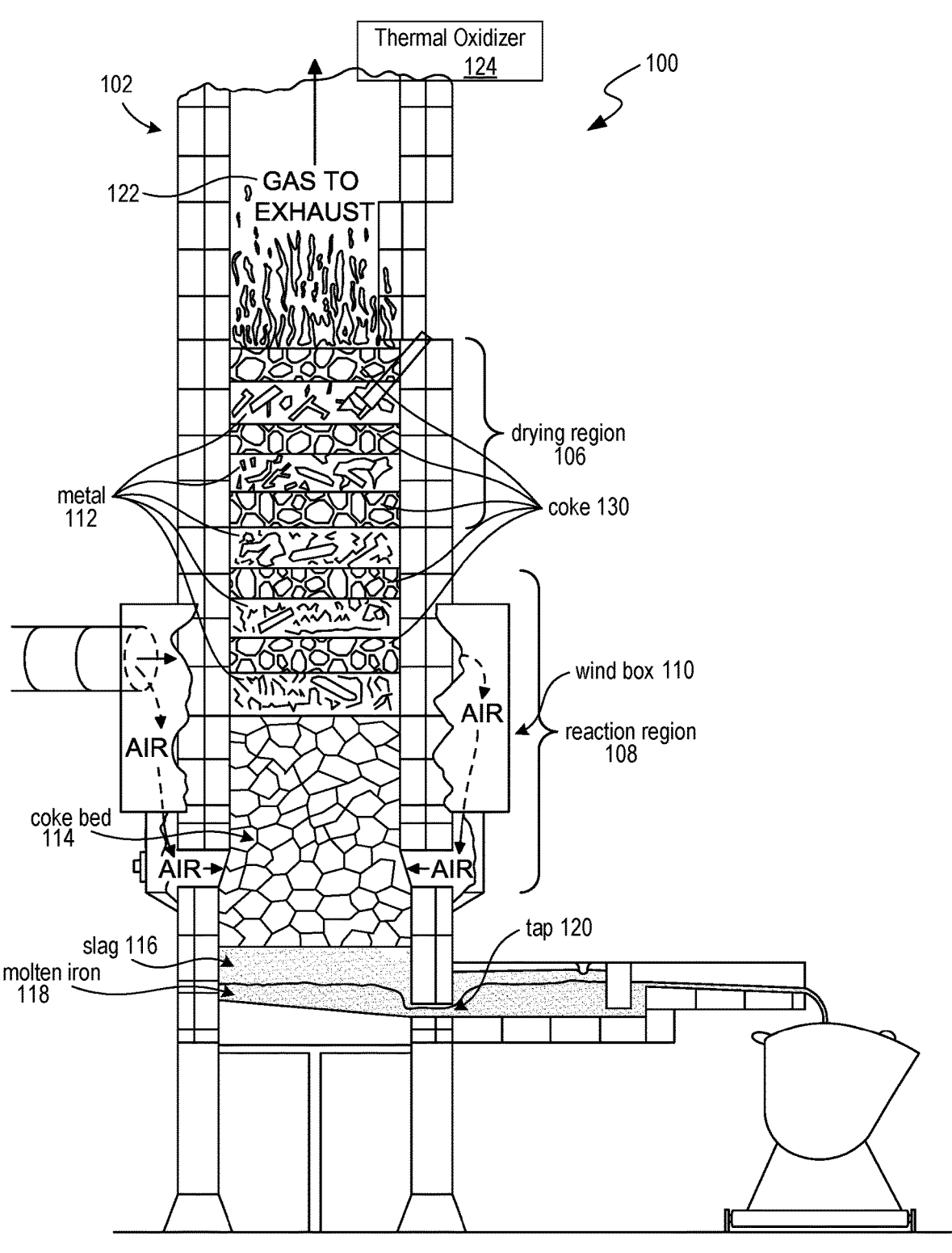
FIG. 1 is a partially schematic illustration of a foundry cupola, in accordance with embodiments of the present technology.

A person skilled in the relevant art will understand that the features shown in the drawings are for purposes of illustrations, and variations, including different and/or additional features and arrangements thereof, are possible.

DETAILED DESCRIPTION

I. Overview

Embodiments of the present technology relate to foundry coke products and associated systems and processing methods via foundry cupolas (e.g., iron foundry cupolas, mineral wool foundry cupolas, lead foundry cupolas, etc.). Foundry cupolas are used to melt metal (e.g., iron and/or recycled steel) to produce usable products. Foundry coke is an input to and provides multiple functions within a cupola, including (i) providing heat from combustion thereof to melt the metal, (ii) supplying carbon to the metal, (iii) providing structural support for the metal, and (iv) creating permeable layers that allow gases to travel upward and spread throughout the cupola to provide contact with the metal.

In operation, as metal and coke heat and progress downward through the cupola, the heat of combustion of the coke causes the metal to melt, decrease in viscosity, and eventually form liquid or molten metal that is high or higher is carbon. At an upper portion or drying region of the cupola, heat dries the cupolas and reduces moistures, but preferably does not burn or combust the coke. If the coke is burned or combusted at the drying region of the cupola (i.e., too early), as opposed to deeper in the cupola at a lower portion or reaction region (e.g., comprising melting, combustion and well zones), relatively high amounts of carbon monoxide and/or hydrogen are produced and released, which corresponds to a loss of carbon and/or less carbon that can be transferred to the metal in the reaction region of the cupola. Stated differently, combusting the coke too early in the cupola, or at an area other than the reaction region, can cause carbon from the coke to react with carbon dioxide to form carbon monoxide. This generally results in efficiency losses and higher costs for steel production, including the need to use more coke and more oxygen or wind at the reaction region of the cupola. Additionally, such undesirable reactions at the upper portion of the cupola can result in more smoke production and a lower metal tap temperature, which can limit operational ability of the cupola and also correspond to efficiency losses. Such undesirable reactions can occur due to characteristics of the coke, including the size, shape, density, porosity, composition, and/or chemistry thereof. For example, an ash fusion temperature of the coke, which is a direct result of the chemistry and/or composition of the coke, can dictate where within the cupola the coke begins to cook. Conventional coke products often have an ash fusion temperature that is too high (e.g., above 2650° F.), and thus do not enable optimal processing of coke in the cupola.

Embodiments of the present technology address at least some of the above-described issues, and include a coke product comprising a size, shape, density, porosity, composition, and/or chemistry that enables a more optimal processing thereof via cupolas. For example, embodiments of the present technology include a coke product having an ash fusion temperature (e.g., below 2600° F., 2500° F., 2400° F., 2300° F., 2200° F., 2100° F., 2000° F., 1900° F., 1800° F., or within a range of 1800-2600° F., 1800-2400° F., or 1800-2200° F.) that enables the coke to be heated and combusted in a time-controlled and/or temperature-delayed manner, such that a core of the coke product (i) is heated and does not undergo combustion or oxidation in the drying region of the cupola and/or (ii) undergo combustion or oxidation in the reaction region (e.g., the melting, combustion and well zones) of the cupola. In doing so, the surface area of the coke that is exposed to metal or molten metal is increased, relative to conventional coke products, and more carbon from the coke can be transferred to the molten metal. Stated differently, unlike traditional coke products, which undergo more oxidation or combustion prior to the reaction region of the cupola and thus undesirably produce carbon monoxide, embodiments of the present technology optimize the melting profile of the metal and maximize the amount of carbon transferred from the coke to the metal within the cupola.

As explained herein, as the foundry coke products of embodiments of the present technology is heated, its core decreases in diameter and one or more diffusion layers can build up around (e.g., at least partially surrounding) the core. The diffusion layers can include (i) a first diffusion layer comprising ash (e.g., an ash diffusion layer) that acts as a rate controlling mechanism to delay combustion and/or oxidation of the coke core, e.g., until the coke progresses through the cupola and reaches the reaction region, and (ii) a second diffusion layer radially outward of the first diffusion layer and comprising iron, which can be a further rate controlling mechanism that also delays combustion and/or oxidation of the coke core. As the coke progresses through the cupola, the ash can be displaced from the coke (e.g., as a liquid) and carbon from the ash can be transferred to the metal within the cupola. In this regard, the ash diffusion layer limits cooking of the coke until the coke reaches the reaction region of the cupola, and as a result more carbon transfer can occur within the reaction region, compared to traditional coke products, which in turn forms carbon dioxide and less carbon monoxide. Moreover, because more of the carbon transfer is happening at the reaction region of the cupola and less or no carbon monoxide is produced outside of the reaction region, the cupolas can be operated at higher temperatures that can lead to increased efficiency and greater operational flexibility. Higher operating temperatures of the cupola can enable less smoke production and lower wind and/or oxygen usage, and can reduce coke usage, all of which result in lower cupolas operating costs. Additionally, higher operating temperatures can enable more desirable (e.g., thinner) steel materials to be produced that have higher profitability. Additional benefits of embodiments of the present technology are described elsewhere herein.

In the Figures, identical reference numbers identify generally similar, and/or identical, elements. Many of the details, dimensions, and other features shown in the Figures are merely illustrative of particular embodiments of the disclosed technology. Accordingly, other embodiments can have other details, dimensions, and features without departing from the spirit or scope of the disclosure. In addition, those of ordinary skill in the art will appreciate that further embodiments of the various disclosed technologies can be practiced without several of the details described below.

II. Coke Processing Via Foundry Cupolas

FIG. 1 is a partially schematic illustration of a foundry cupola 100, in accordance with embodiments of the present technology. The cupola 100 is a triple bed reactor containing gases, liquids, and solids along a length of the cupola 100. As shown in FIG. 1, the cupola 100 includes a refractory-lined elongate furnace body 102 including an inlet opening at a top of the body 102 configured to receive metal 112 comprising iron and/or steel, as well as coke 130 and fluxing material. The body 102 includes a drying region 106 at an upper portion of the cupola, and a reaction rection 108 downstream of the drying region 106. The reaction region 108 can include a melting zone, a combustion zone downstream of the melting zone, and a well zone downstream of the melting zone. The cupola 100 further comprises a wind box 110 configured to provide a source of oxygen to the body 102 and enable combustion of the coke 130. As metal 112 and coke 130 proceed through the body 102 of the cupola 100, slag 116 and molten iron 118 form at a lower portion of the cupola 100. The molten iron 118 can be used to produce desirable steel products, and the slag 116 can be used as an aggregate in multiple end use applications.

In operation, the coke 130 supplies carbon to the metal 112 and provides structural support for the metal 112 within the body 102. Additionally, combustion of the coke 130 provides heat that melts that metal 112 and causes it to transition from a solid material to a molten liquid along a length of the body 102. In representative embodiments, the coke 130 is dried at the drying region of the cupola 100 to reduce moisture therefrom, but is not oxidized or combusted. That is, carbon content of the coke remains in the coke at this stage and does not react to form carbon monoxide. If carbon monoxide is formed at the drying region or this high up in the body 102, the carbon of the formed carbon monoxide is released from the upper portion of the cupola 101 and is not able to be transferred to the metal 112 at the downstream reaction region 108 of the cupola 100. Additionally, combusting and/or oxidizing the coke and/or production of carbon monoxide at the drying region generally results in efficiency losses and higher operating costs for the cupola 100.

The coke 130 of the present technology is inhibited or prevented from being oxidized and combusted in the drying region 106 due to, e.g., the size, shape, density, porosity, composition, and/or chemistry of the coke. As the coke 130 is heated within the body 102, moisture decreases in the drying region 106, and the coke 130 undergoes oxidation and combustion in the reaction region 108. As a result of such oxidation and/or combustion, a core of individual coke particles 130 radially decreases in size and one or more diffusion layers forms around the core, as explained herein with reference to FIG. 2. The one or more diffusion layers act as a rate-limiting mechanism to inhibit oxidation and combustion within the drying region 106, and promote oxidation and combustion within the reaction region 108.

The size, shape, porosity, density, and other characteristics of the coke 130 can also contribute to the optimal melting, oxidizing, and/or combusting profile desired for the cupola 100. For example, the coke 130 can be about 4×6" length (i.e., 4"+) or 3.5×6" which desirably enables a lower pressure drop in the cupola 100, relative to smaller coke products. In some embodiments, the coke 130 can comprise foundry coke greater than 4", egg coke greater than 2×4", stove coke greater than 1×2", and breeze less than 1". Including a combination of foundry coke greater than 4" as well as egg coke of or greater than 2×4" can decrease costs of the coke blend because 2×4" coke is less expensive. Additionally or alternatively, a combination of foundry coke greater than 4" as well as egg coke of or greater than 2×4" can provide an optimal coke blend to improve pressure drop and/or carbon transfer from coke to metal. In some embodiments, egg coke can comprise less than 20% of the coke blend or between 10-20% of the coke blend. Additionally or alternatively, in some embodiments less than 10%, less than 8%, or less than 6% of the coke 130 in the cupola 100 is less than 2".

As another example, the coke 130 can have an elongate or oblong shape, which, relative to the traditional more round, less elongate shapes of other coke products, enables a higher surface area to volume ratio and thereby improves contact and thus carbon transfer between the coke 130 and the metal 112. As another example, the coke 130 can have a porosity (e.g., between 20-50%, 30-50%, or 40-50%), which desirably enables the gas to permeate through the coke 130 and spread heat within the cupola 100, while also providing sufficient structural support for the metal 112. As another example, the coke 130 can have a higher density, relative to conventional coke products, and thus have a higher carbon content and better calorific value that enables less coke usage within the cupola 100.

As the coke 130 and metal 112 progress through the cupola 100, the metal 112 and ash of the coke 130 each begins to melt and decrease in viscosity along a length of the cupola 100. The melted ash can beneficially more quickly move through the coke bed 114 and/or body 102 generally, and thus increase contact time with the metal 112 to improve carbon transfer. Within the reaction region 108, carbon is transferred from the coke 130 to the metal 112. In some embodiments, at least 10%, 20%, 30%, 35%, 40%, 45%, 50%, or 55% of the carbon from the coke is transferred to the metal (e.g., the molten metal) within the cupola 100. Additionally, oxygen from air provided via the wind box 110 of the cupola 100 reacts with carbon of the coke 130 causing combustion and carbon dioxide production, as well as heat and gases used to heat upper portions of the cupola 100, e.g., to reduce moisture of the coke 130 with the drying region 106. By maximizing the production of carbon dioxide at the reaction region 108, or at areas deeper in the cupola 100, less carbon monoxide and more carbon dioxide is produced which leads to higher metal tap temperatures at the tap 120 of the cupola 100. A higher tap temperature can improve carbon conversion which lower coke usage, and enables lower wind and/or less oxygen injection. For embodiments of the present technology, for example, the iron to coke (or carbon) ratios can be at least 11:1, 12:1, 13:1, 14:1, 15:1, 16:1, or 17:1, whereas for traditional coke products the iron to coke (or carbon ratios) are no higher than 11:1 and more typically less than 10:1. As such, due to efficiency gains, embodiments of the present technology enable less coke usage and thus decreased operating costs.

The coke 130 has a fixed carbon content that is transferred to the iron/metal, or released from the top of the cupola 100 via gaseous carbon monoxide or carbon dioxide. For reasons described herein, the coke 130 of the present technology promotes transfer of the fixed carbon content to the iron/metal, as a result also limit the amount of carbon monoxide produced and released from the cupola. For example, the coke 130 of the present technology can limit the amount of carbon monoxide released from the cupola 100 to be less than 60 lbs/hr, 55 lbs/hr, 50 lbs/hr, 45 lbs/hr, 40 lbs/hr, 35 lbs/hr, 30 lbs/hr, or 25 lbs/hr. Relatedly, for embodiments of the present technology, the amount of fixed carbon content of the coke 130 that is released from the cupola 100 via carbon monoxide can be no more than 60%, 50%, 45%, 40%, 35%, or 30%. Additionally or alternatively, embodiments of the present technology can include a ratio for the amount of the fixed carbon content released as carbon monoxide relative to the amount of carbon released as carbon dioxide can be no more than 2.2:1, 2.1:1, 2.0:1, 1.95:1, or 1.9:1.

The cupola 100 can further include a thermal oxidizer 124, which can include a thermocouple to monitor temperature and/or be configured to oxidize hazardous air pollutants (HAPs) and/or volatile organic compounds (VOCs). In practice, the thermal oxidizer 124 can operate based on maintaining a minimum temperature (e.g., 1700° F., 1750° F., 1800° F., 1850° F., 1900° F., 1950° F., or 2000° F.) at the inlet of the body 102 where gases (e.g., carbon monoxide and hydrogen) are released from the cupola 100. If, for example, too much carbon monoxide is undesirably produced, particularly within the drying region 106, the temperature at the inlet or elsewhere of the body 102 can decrease and cause the thermal oxidizer 124 to fire and thereby oxidize the HAPs or VOCs and form, e.g., carbon dioxide and water.

Figure 2:
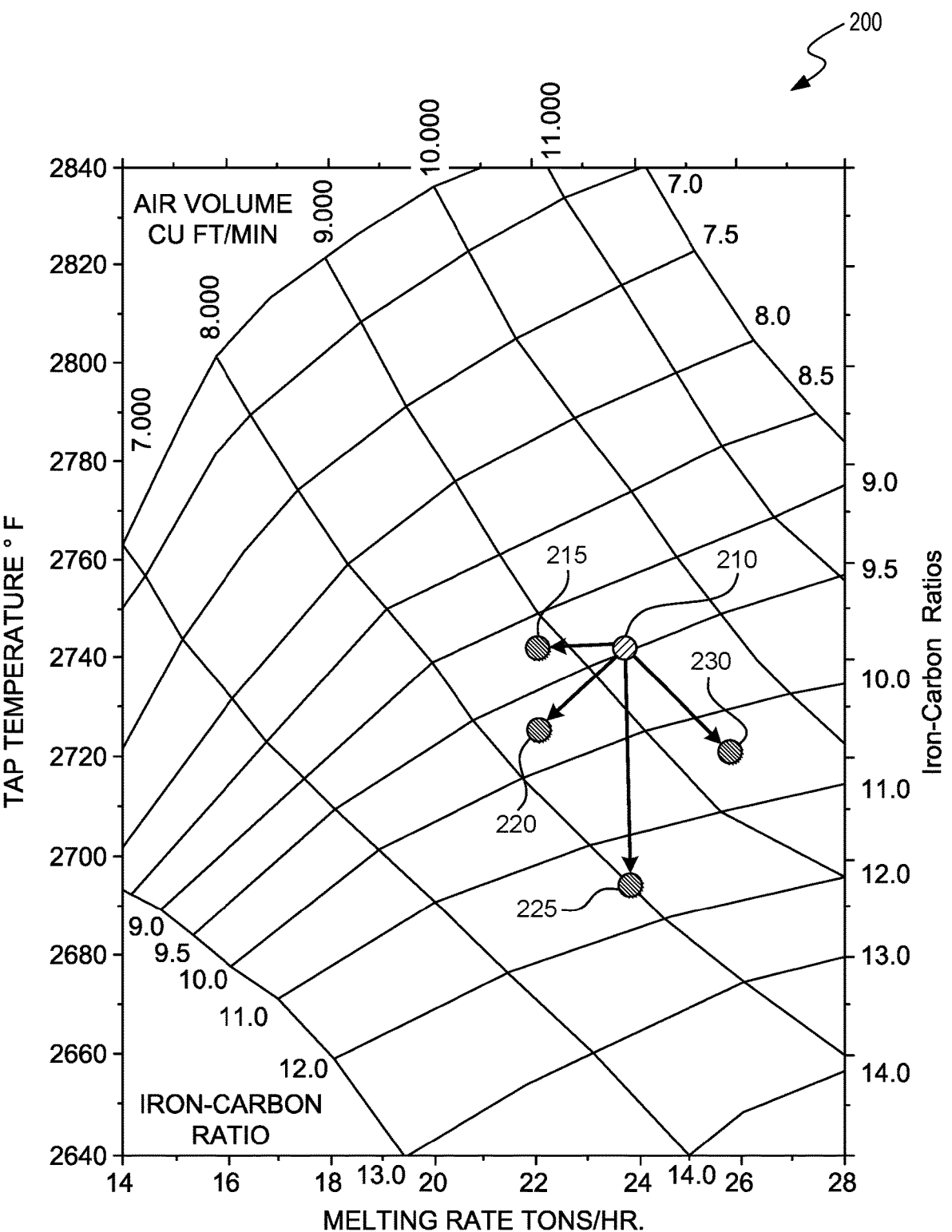
FIG. 2 is a plot illustrating the relationship between tap temperature, air volume rate, melting rate, and iron to carbon ratio for a foundry cupola, in accordance with embodiments of the present technology.

FIG. 2 is a plot 200 illustrating the relationship between tap temperature, air volume (i.e., wind) rate, melting rate, and iron to carbon ratio for a foundry cupola, in accordance with embodiments of the present technology. A higher tap temperature, higher iron to carbon ratio, and lower wind are generally desired for a given melting rate, as these parameters each correspond to efficiency gains and/or decreased operating costs for cupola operators. Embodiments of the present technology enable a relatively higher tap temperature compared to convention coke products, and thus provide a larger operational window and flexibility for cupola operators to adjust other factors (e.g., tap temperature and wind rate) while maintaining a desired melting rate. Referring to FIG. 2, point 210 corresponds to a base operation that may be enabled by coke products of the present technology. Point 210 corresponds to an iron to carbon ratio of about 9.5, a tap temperature of about 2740° F., a melting rate of 24 tons/hr, and an air volume rate of about 9.3 ft³/min. Points

215, 220, 225, and 230 illustrate optional operational changes that may be enabled based on tap temperature and/or the quality of coke used. For example, relative to point 210, point 215 corresponds to the same tap temperature of 2740° F. but uses less wind (approximately 8.8 ft$^3$/min). As a result of the lower wind, the melting rate is decreased about 10% to 22 tons/hr and about 3% more coke is needed. Point 220 corresponds to a lower tap temperature (approximately 2720° F.) and less wind (approximately 8.4 ft$^3$/min), which results in a melting rate decrease of about 10% to 22 tons/hr and needing about 3% less coke. Point 225 corresponds to a lower tap temperature (approximately 2690° F.) and less wind (approximately 8.0 ft$^3$/min), which results in the same melting rate as point 210 and needing about 17% less coke. Point 230 corresponds to a lower tap temperature and the same wind as point 210, which results in an increased melting rate needing about 10% less coke. The plot 200 and points 210, 215, 220, 225, 230 illustrate the benefits that coke products of embodiments of the present technology provide.

III. Foundry Coke Composition and Characteristics

Figure 3:
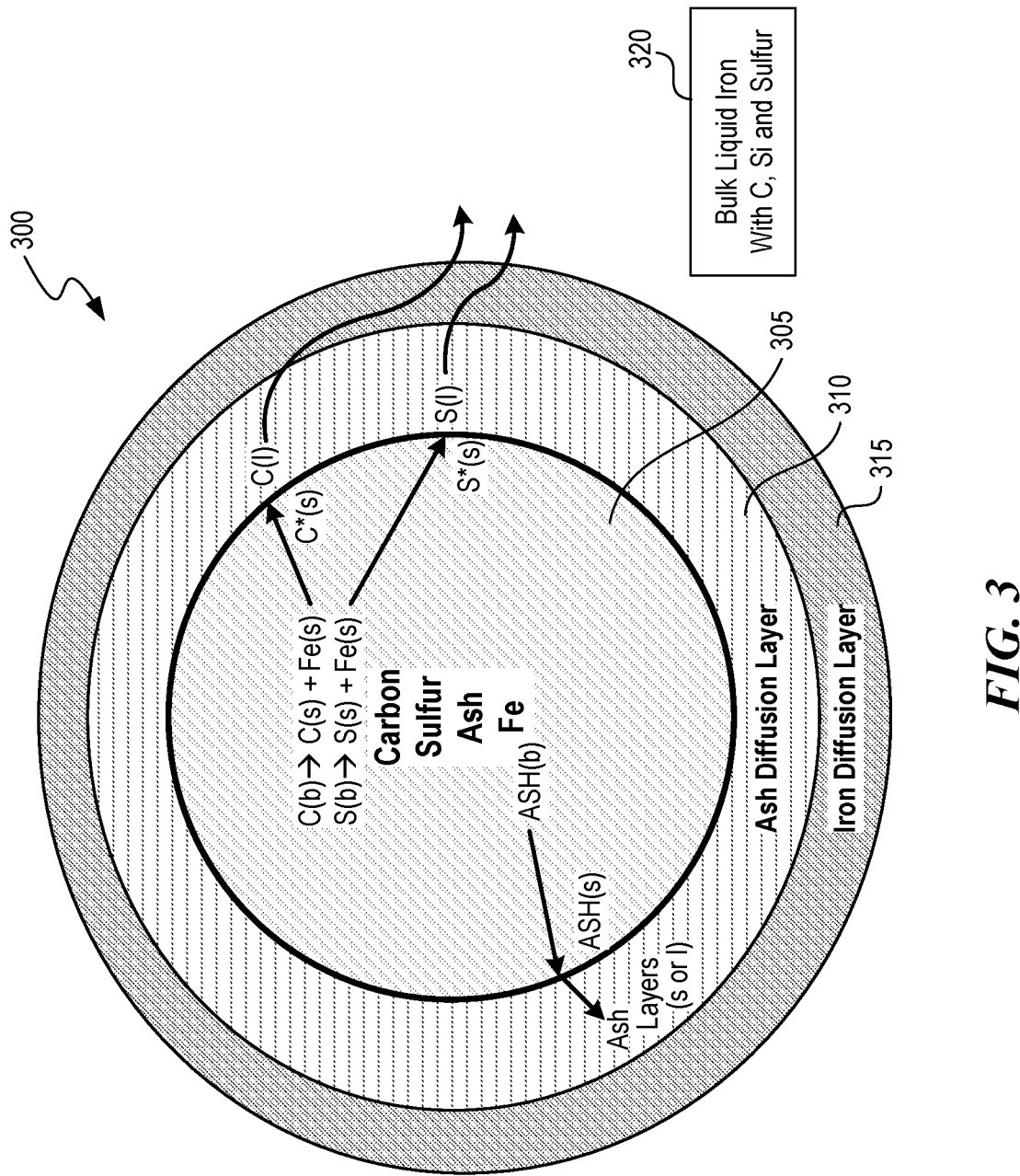
FIG. 3 illustrates the coke chemistry of a coke product during oxidation in a cupola, in accordance with embodiments of the present technology.

FIG. 3 illustrates a coke particle 300 configured to be heated in a foundry cupola (e.g., the cupola 100; FIG. 1), in accordance with embodiments of the present technology. As shown in FIG. 3, C(b)=carbon bulk, S(b)=sulfur bulk, Ash (b)=ash in bulk, C(s)=surface carbon, S(s)=surface sulfur, Ash(s)=surface ash (which builds up from the shrinking core), Fe(s)=surface Fe, C*(s)=active carbon surface, FeC, S*(s)=active sulfur surface, FeS, C(l)=carbon in liquid, and S(l)=sulfur in liquid. The coke particle 300 includes a core 305 that shrinks due to carbon dissolution in a cupola, where the coke particle 300 can be surrounded by a bulk liquid 320. As the core 305 of the coke particle 300 shrinks, e.g., due to oxidation and/or combustion of the carbon of the coke particle 300, diffusion layers comprising ash and iron that are radially outward of the core 305 begin to form. For example, the coke particle 300 can include a first or ash diffusion layer 310 ("first diffusion layer 310") comprising ash that is radially outward of the core 305 and at least partially surrounds the core 305, and a second or iron diffusion layer 315 ("second diffusion layer 315") that is radially outward of the core 305 and first diffusion layer 310 and at least partially surrounds the first diffusion layer 310.

The first diffusion layer 310 layer can be solid or liquid, and can effectively block the coke surface, or lower the mass transfer area across the coke surface into the surrounding liquid metal. Additionally or alternatively, the first diffusion layer 310 enables oxidation and/or combustion of the carbon of the coke particle to be time and/or temperature delayed, such that the coke does not produce carbon monoxide in the drying region and instead is oxidized and combusted in the reaction region of the cupola. The first diffusion layer 310 comprising ash is formed in part due to the ash fusion temperature of the coke product, which is directly correlated to the composition of the coke particle 300. As described elsewhere herein, the ash fusion temperature of the coke is lower than traditional coke products, and can no more than 2650° F., 2600° F., 2550° F., 2500° F., 2450° F., 2400° F., 2350° F., 2300° F., 2250° F., 2200° F., 2150° F., 2100° F., 2050° F., 2000° F., 1950° F., 1900° F., 1850° F., or within a range of 1800-2600° F., 1800-2500° F., 1900-1300° F., or 2000-2200° F. This relatively low ash fusion temperature can enable formation of the diffusion ash layer, e.g., in the drying region of the cupola, that prevents cooking of the coke, or more particularly the core 305, prior to the reaction region. Additionally or alternatively, this relatively low ash fusion temperature can optimize contact time between the coke 300 and the metal within the cupola once the metal melts and becomes molten at the reaction region of the cupola. As a result, more carbon can be transferred from the coke 300 to the metal. This is in contrast to conventional coke products, which can have a higher ash fusion temperature that results in ash being formed deeper (i.e., downstream) of the reaction region and thus limits the contact time between the coke and the molten metal, thereby resulting in relatively less carbon transfer.

The second diffusion layer 315 is formed as the coke particle 300 is heated within the cupola and the coke core 305 shrinks. The second diffusion layer can further limit cooking of the coke within the drying region and/or help ensure the vast majority of combustion and oxidation of the coke does not occur until the coke 300 reaches the reaction region. Additionally or alternatively, carbon and sulfur may compete with one another to pass through the second diffusion layer 315. That is, the presence of sulfur can undesirably decrease the transfer rate of carbon from and out of the coke 300. In some embodiments, the coke can be pre-fluxed and/or include (e.g., doped with) an additive (e.g., calcium, iron, calcium oxide, magnesium oxide, iron oxide, sodium oxide, and potassium oxide, and/or other oxides having a relatively low melting point) that acts as a catalytic material. As an example, sodium can act as a pre-fluxing agent, and iron can act as a pre-fluxing and catalytic agent. The catalytic material can trap sulfur and therein be utilized to flux the sulfur out of the coke. In some embodiments, the pre-fluxed coke is a result of selecting coals to produce the coke that have ash materials proportionally higher in the oxides described above. This is in contrast to coke products that may add calcium oxide or calcium carbonate particles/rocks as a flux to remove ash, as such methods are inefficient due to the very low surface to volume ratio for the fluxing to actually occur. Additionally, the pre-fluxed coke and/or catalytic agents can promote the carbon deposition via the Boudouard reaction, thereby generating more heat and increasing the amount of carbon that is present within the reaction region (e.g., the combustion zone) of the cupola. Without being bound by theory, the pre-fluxing agents can alter the liquids temperature of the slag (e.g., slag 116; FIG. 1) or, more particularly, can alter the liquids temperature of the ash at the surface or interior of the coke that is blended into the bulk slag.

Improved coke chemistry aims at increasing carbon dissolution from the coke particle 300 into the metal (i.e., the iron or steel) within the cupola. In operation, as carbon dissolves into the bulk liquid iron within the cupola, the coke core 305 shrinks and the ash and impurities are built up at the surface. Additionally, carbon and sulfur both dissociate from the surface, which can be aided by catalytic activity of Fe, Ni and other metals. A lower ash melting temperature, represented by an ash fusion temperature (as described elsewhere herein), allows improved ash removal by faster conversion of ash into a liquid phase and reduces ash resistance. Carbon and sulfur diffuse through the thin iron diffusion layer. Additionally, carbon and sulfur are competitive and resistant to dissolving or transferring of each other. As such, a low sulfur content of the coke improves carbon transfer. In addition, coke products having a high coke reactivity index (CRI) or a low coke strength after reaction (CSR) (as described elsewhere herein) allows more reactive carbon forms to dissociate from the surface thereby increasing the carbon dissolution rate.

Various metals added to a foundry coke product produced from a coal blend via ash in the coal blend or otherwise introduced into the foundry coke product can provide catalytic functions that increases a carbon dissolution rate. In some embodiments, a multi-oxidation state element (e.g., a metal) may change oxidation states in a coke product to provide catalytic activity. For example, a coke product may include sodium, which may transition from an unoxidized state Na into a first ionic oxidation state $Na^+$. Alternatively, or additionally, a coke product may include iron, which may transition from an unoxidized state Fe into the oxidized states $Fe^{2+}$ or $Fe^{3+}$. Furthermore, the coke product may include the multi-oxidation state elements in an oxidized form. For example, the coke product may include $Na^+$ in the form of a salt or $Fe^{3+}$ in the form of $Fe_2O_3$. The coke product may also include other types of metals, such as nickel, copper, etc. The catalytic material embedded in the coke product increases carbon dissolution during steel production because at least some of the catalytic material will remain in contact with the interface between the coke product and a liquid iron bath during steel production.

Figure 4:
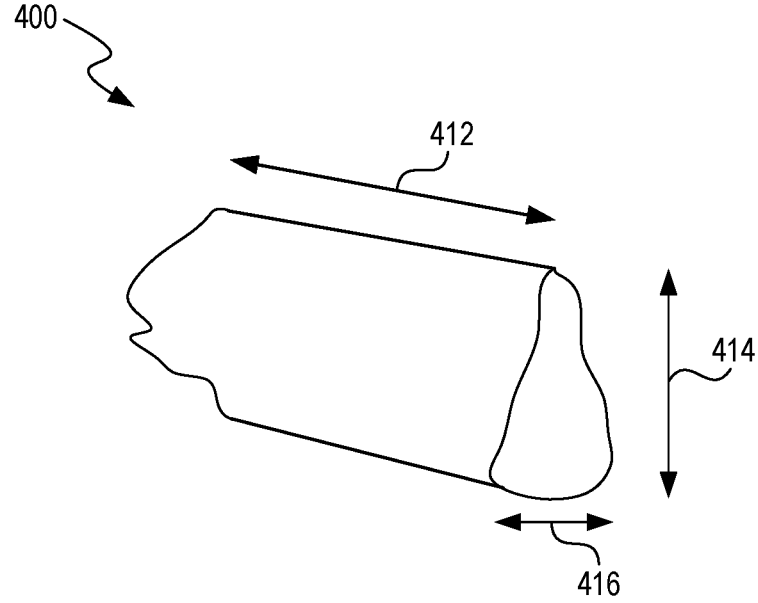
FIG. 4 depicts an example foundry coke product and a table of foundry coke properties, in accordance with embodiments of the present technology.

FIG. 4 depicts a foundry coke product 400 and a table 450 of foundry coke properties, in accordance with embodiments of the present technology. The foundry coke product 400 can be produced using a coke oven (e.g., a heat recovery oven or non-heat recovery oven). In some embodiments, the foundry coke product 400 can be generally oblong shaped and can have different or similar dimensions along a first length 412, a second length 414, and/or a third length 416. For example, the first length 412 can be greater than 6.0 inches (e.g., 9.0 inches) or within a range of 6.0-12.0 inches, the second length can be greater than 2.5 inches (e.g. 4.0 inches), and the third length can be greater than 2.5 inches (e.g., 4.0 inches). In some embodiments, one or more lengths of the shape of the foundry coke product 400 can be limited to a maximum value. For example, the first length 412 can be between 6.0 inches and 12.0 inches.

Due to variations in the specific shape of foundry coke products, a foundry coke product can be characterized by a range of hydraulic diameters. For example, the foundry coke product 400 can have a hydraulic diameter that is greater than or equal to 1.0 inches, greater than or equal to 2.0 inches, or greater than or equal to 3.0 inches, etc. In some embodiments, the hydraulic diameter of a foundry coke product can be greater than an actual diameter of the foundry coke product due to the cross-sectional geometry of the foundry coke product.

The table 450 includes a set of attributes of the foundry coke product 400. Such attributes can be advantageous for foundry operations, such as having lower ash fusion temperature values in comparison to conventional coke products. Ash fusion temperature can be obtained in various ways. In some embodiments, ash fusion temperature can be measured from a sample of ash created by burning a coal, coal blend, or coke product to completion. The ash elemental analysis can be performed on each element, for example, individual silicon atoms create a signal in the analytical instrument. To obtain a mass percentage value used for model ash fusion calculation, some embodiments of the present technology can treat all elements as fully oxidized and determine a mass percentage is based oxidized forms. For example, some embodiments of the present technology can determine the SiO2 mass but not the Si mass. In some embodiments, the mass percentages of $SiO_2$, $Al_2O_3$, $Fe_2O_3$, CaO, other compounds, etc., can be normalized to sum up to 100%.

Alternatively or additionally, ash fusion temperature can be measured by an ash fusion temperature test, such as a standard American Society for Testing and Materials (ASTM) method D1857. For example, some embodiments of the present technology can determine an initial deformation temperature (IDT), softening temperature (ST), hemispherical temperature (HT), and flow temperature (FT). These measured temperatures can have different values with respect to each other, and can be used to characterize a particular coal, coal blend, or coke product. Furthermore, as discussed elsewhere, the composition of the ash remaining from combustion of a coal or coal blend is considered to be the same as the ash remaining after combustion of a coke product produced from the coal or coal blend. Some embodiments can characterize a coal blend ash composition as the weighted average of the ash compositions of the coal components weighted by their respective mass fractions in the coal blend.

The ash fusion temperature can be calculated based on the ash composition using Formula (IA) (Cupola Handbook, 6th ed., © 1999, American Foundrymen's Society, Inc., Chapter 8), below:

$$AFT \ (^\circ \ C.) = 19 \ X \ (\text{wt \% of } Al_2O_3) + \qquad \text{(Formula IA)}$$
$$15 \ X \ (\text{wt \% of } SiO_2 + \text{wt \% of } TiO_2) +$$
$$10 \ X \ (\text{wt \% of } CaO + \text{wt \% of } MgO) +$$
$$6 \ X \ (\text{wt \% of } Fe_2O_3 + \text{wt \% of } Na_2O)$$

Because $K_2O$ is known to be in ash samples and given the similarity of Na and K the $K_2O$ is may have a similar impact on the ash fusion temperature as $Na_2O$. Formula (IA) may be modified to include the amount of $K_2O$ in the calculation as shown in Formula (IB) below:

$$AFT \ (^\circ \ C.) = 19 \ X \ (\text{wt \% of } Al_2O_3) + \qquad \text{(Formula IB)}$$
$$15 \ X \ (\text{wt \% of } SiO_2 + \text{wt \% of } TiO_2) +$$
$$10 \ X \ (\text{wt \% of } CaO + \text{wt \% of } MgO) +$$
$$6 \ X \ (\text{wt \% of } Fe_2O_3 + \text{wt \% of } Na_2O + \text{wt \% of } K_2O)$$

For embodiments of the present technology, ash fusion temperature values can be represented in various forms, such as the initial deformation temperature (IDT) or softening temperature (ST) values. For example, sample "S4" shown in the table 450 has an ash fusion IDT equal to 2150° F. (1177° C.). Some embodiments can perform operations to reduce a low ash fusion to a coke product based on an ash fusion temperature threshold or target ash fusion range.

In some embodiments, a target ash fusion temperature value or ash fusion temperature range can vary based on the type of ash fusion value being used. In some embodiments, a produced coke product can have an IDT that is between 2100-2400° F. Some embodiments can include stricter limits on coke products and can include a coke product having an IDT that is between 2100-2250° F. Some embodiments can change coal blends or manufacturing thereof to satisfy a target IDT. For example, some embodiments of the present technology can select a coal blend or determine oven operations based on a target IDT value of approximately 2100° F., 2150° F., 2200° F., 2250° F., 2300° F., 2350° F., or 2400° F. In some embodiments, coke products are produced that have an ST within a specified range, such as between 2150-2500° F., or approximately 2100° F., 2150° F., 2200° F., 2250° F., 2300° F., 2350° F., 2400° F., 2450° F., or 2500° F. Furthermore, some embodiments of the present technology can set a target IDT value as a function of a target ST value.

Similarly, embodiments of the present technology can produce coke products having an HT between 2200-2350° F., 2150-2300° F. Furthermore, some embodiments of the present technology can change coal blends, soak times, or durations at different damper positions to satisfy a target HT. For example, some embodiments of the present technology can select a coal blend or determine oven operations based on a target HT value of approximately 2200° F., 2250° F., 2300° F., 2350° F., 2400° F., 2450° F., or 2500° F. Similarly, embodiments of the present technology can produce coke products having an FT between 2250-2600° F. or 2250-2400° F., or approximately 2250° F., 2300° F., 2350° F., 2400° F., 2450° F., 2500° F., 2550° F., or 2600° F.

Embodiments of the present technology can also produce coke products that satisfy multiple target ranges for different types of ash fusion temperature values. For example, coke products can have an IDT between 2100-2250° F., an ST between 2150-2300° F., an HT between 2200-2350° F., and/or an FT between 2250-2400° F. Additionally or alternatively, various other combination of target ranges for a coke product are possible. For example, embodiments of the present technology can include coke product having an IDT between 2100-2250° F., an ST between 2150-2300° F., an HT between 2200-2350° F., and an FT between 2250-2400° F.

As shown in the table 450, the CRI value of the foundry coke products can be 36.5% or another value that is greater than 35%. Some embodiments can implement coke production operations that produce batches of foundry coke that satisfy one or more CRI thresholds. For example, embodiments of the present technology can include coke products having a CRI of at least 25.0%, 30.0%, 35.0%, 40.0%, or 45.0%. Some embodiments can perform operations to select coke products that have CRI greater than a minimum CRI threshold for downstream use.

As shown in the table 450, the CSR value of the foundry coke products can be 26%, 15.6%, or another value that is greater than a CSR threshold such as 7.0%. Some embodiments can implement coke production operations that produce batches of foundry coke that satisfy one or more CSR thresholds. For example, embodiments of the present technology can include coke products having a CSR of no more than 40.0%, 35.0%, 30.0%, 25.0%, 20.0%, 15.0%, 10.0%, or 7.0%.

As shown in the table 450, an $SiO_2$ composition of the coke product ash can include 49.4%, 48.9%, 48.8%, 49.1%, or 46.0%. Other embodiments can include other $SiO_2$ mass fractions in ash, such as other values less than 70%, 50.0%, or 45.0%. In some embodiments, a mass fraction of approximately 50.0% SiO2 in coke product ash can correspond to a low amount of SiO2 in the coke product itself.

Embodiments of the present technology can include coke products having a fixed carbon content (e.g., a fixed carbon mass fraction) that is greater than or equal to a fixed carbon threshold. For example, embodiments of the present technology include coke products having a fixed carbon mass fraction that is greater than 80.0%, 85.0%, 90.0%, 90.5%, or 91.0%. In some embodiments, the fixed carbon content can be a targeted range, such as 80-91%, 85-95%, or 90-95%.

Embodiments of the present technology can generate coke products having an ash mass fraction within a targeted bounded or unbounded range. For example, embodiments of the present technology can produce foundry coke products having an ash mass fraction of at least 1.0%, 5.0%, 8.0%, 9.0%, or 10.0%. Furthermore, some embodiments of the present technology can include an upper bound to an ash mass fraction. For example, some embodiments of the present technology can produce foundry coke products having an ash mass fraction that is less than 5.0%, 9.0%, or 10.0%.

Figure 5:
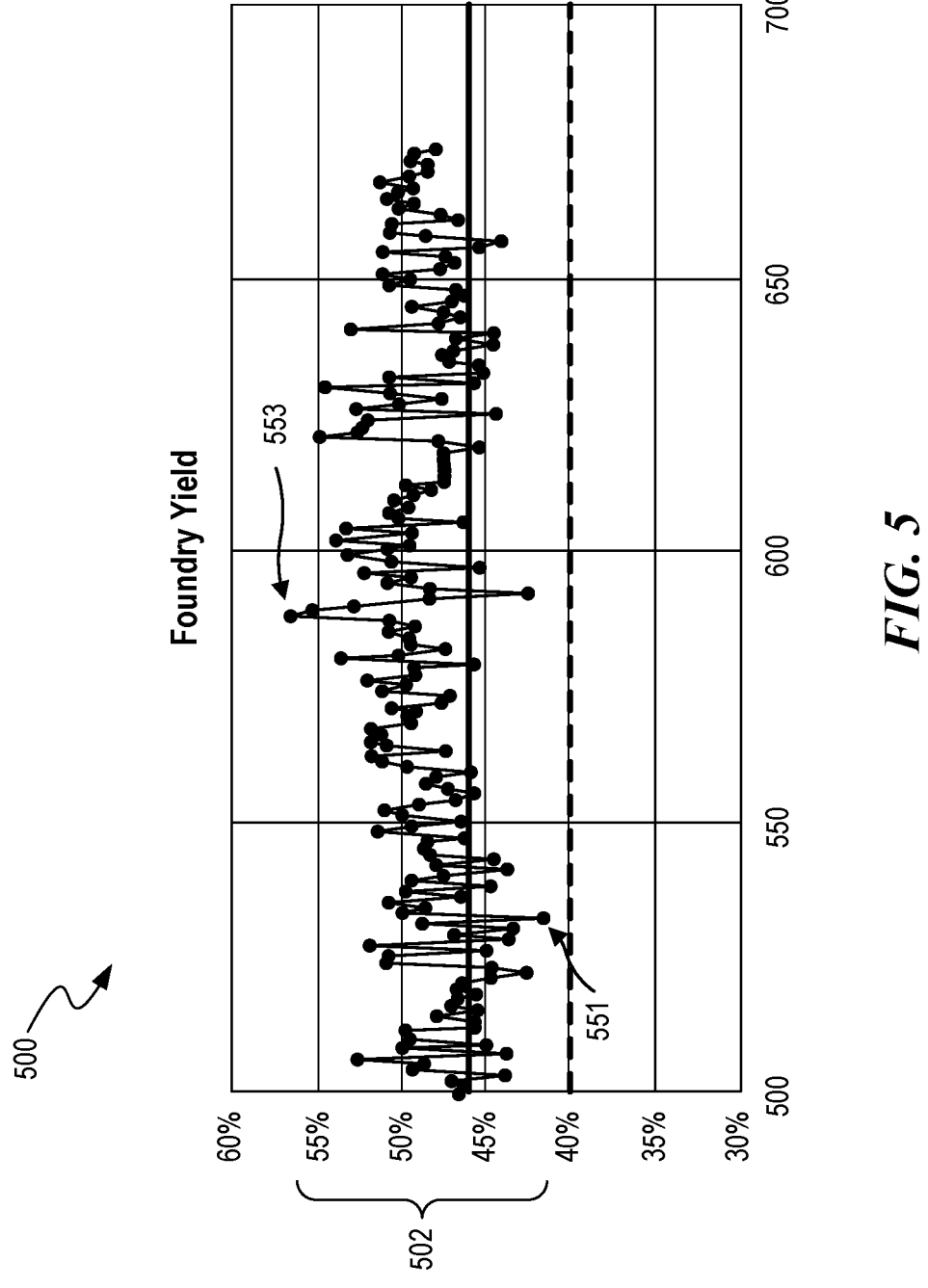
FIG. 5 is a chart indicating foundry coke product yield, in accordance with embodiments of the present technology.

FIG. 5 is a chart 500 indicating foundry coke product yield in accordance with embodiments of the present technology. As shown in the chart 500, the foundry yield for different batches of coke products produced can vary. As shown by the range 502, the yield can range between approximately 40% and 60%, where this yield can be a dry yield (i.e., the dry mass fraction of foundry coke product can be 40% or 60% of the dry mass fraction of the total population of coke products). More specifically, yields can vary from approximately 57%, as illustrated by data point 553, to 41%, as illustrated by data point 551. In many cases, embodiments of the present technology can implement operations that satisfy a minimum yield threshold, such as operations that result in a yield that is at least 25%, at least 30%, at least 40%, at least 50%, or at least 55%. While some embodiments of the present technology can implement controller optimization operations to increase a yield, some embodiments of the present technology can permit a predicted yield to be less than an expected maximum yield in order to satisfy other target coke product parameters.

Figure 6:
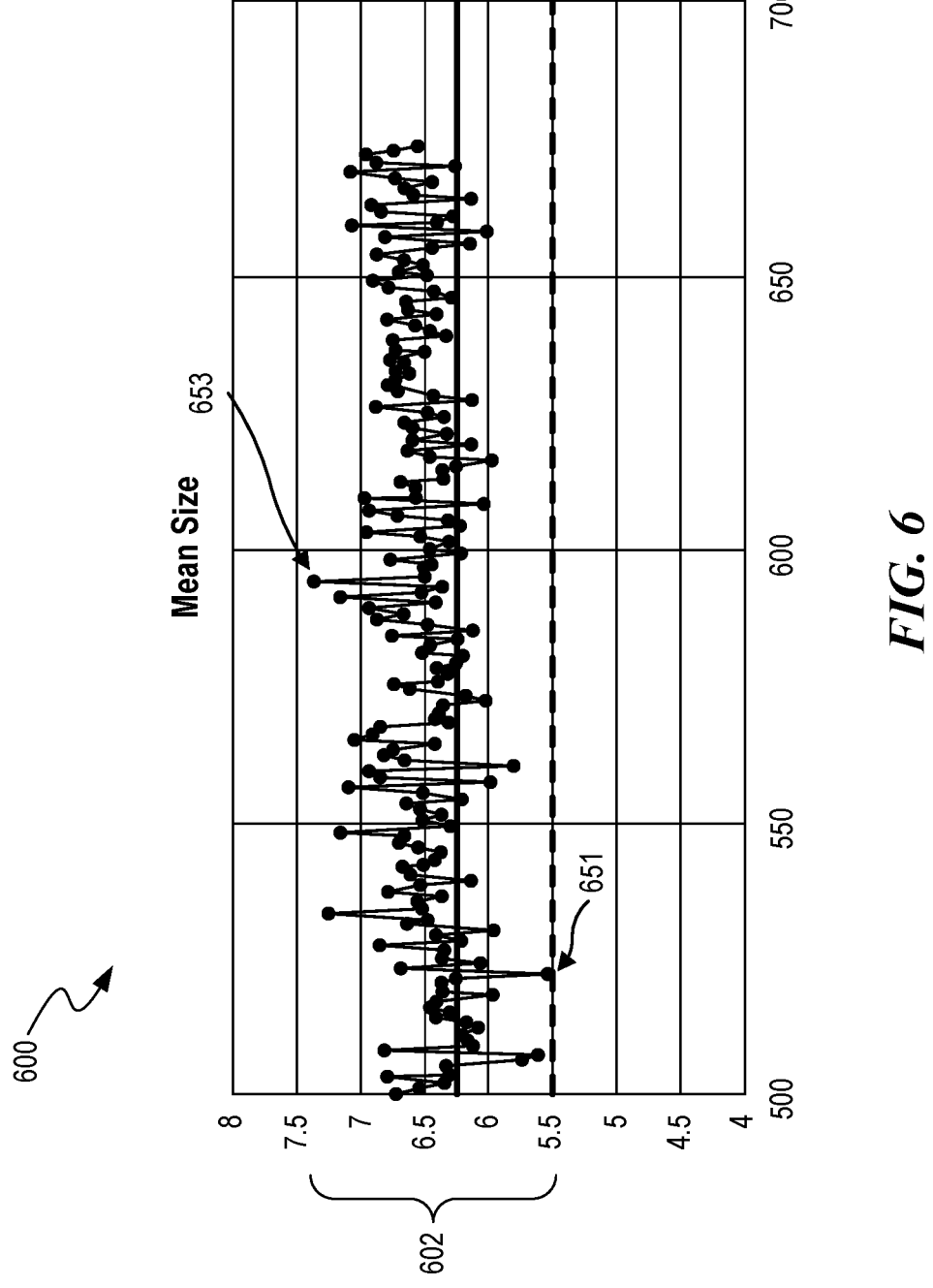
FIG. 6 is a chart indicating particle size of foundry coke products, in accordance with embodiments of the present technology.

FIG. 6 is a chart 600 indicating particle size, in accordance with embodiments of the present technology. As shown in the chart 600, the mean batch lengths in inches for different batches of coke products produced from a coal blend using operations described in this disclosure can vary. As shown by range 602, the coke product mean length can range between approximately 5.5 inches, as illustrated by point 651, to approximately 7.5 inches, as illustrated by point 653.

Figure 7:
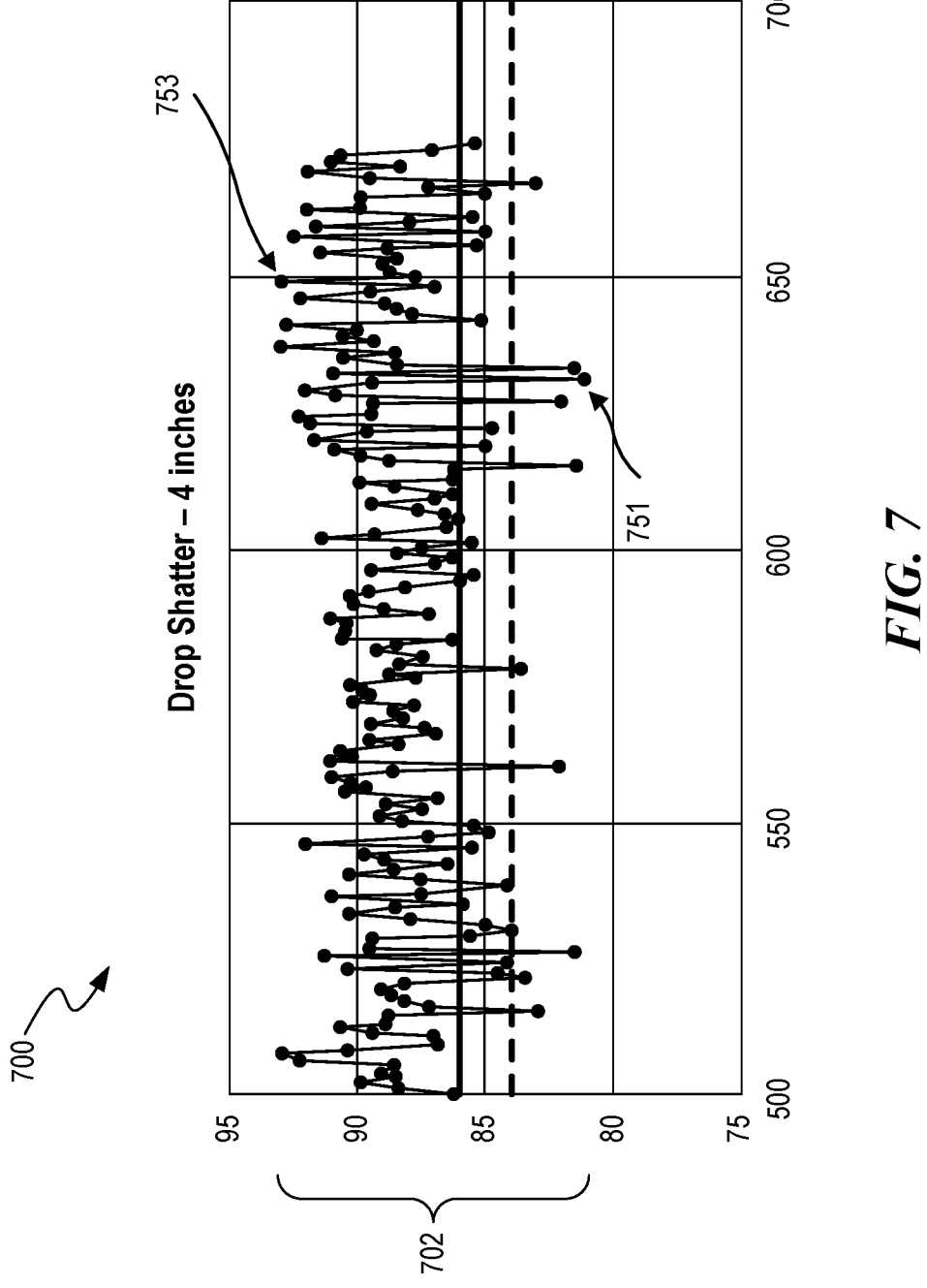
FIG. 7 is a chart indicating 4-inch drop shatter properties of foundry coke products, in accordance with embodiments of the present technology.

FIG. 7 is a chart 700 indicating 4-inch drop shatter properties, in accordance with embodiments of the present technology. As shown in the chart 700, the 4-inch drop shatter survival rates for different batches of coke products can range between approximately 80%, as illustrated by point 751, to approximately 95%, as illustrated by point 653. In many cases, embodiments of the present technology can implement operations that satisfy a minimum 4-inch drop shatter survival rate threshold, such as operations that result in a 4-inch drop shatter survival rate of at least 80%, 85%, 90%, or 95%. In many cases, a greater drop shatter survival rate is useful for downstream foundry operations because more coke products survive transportation and downstream processing.

Figure 8:
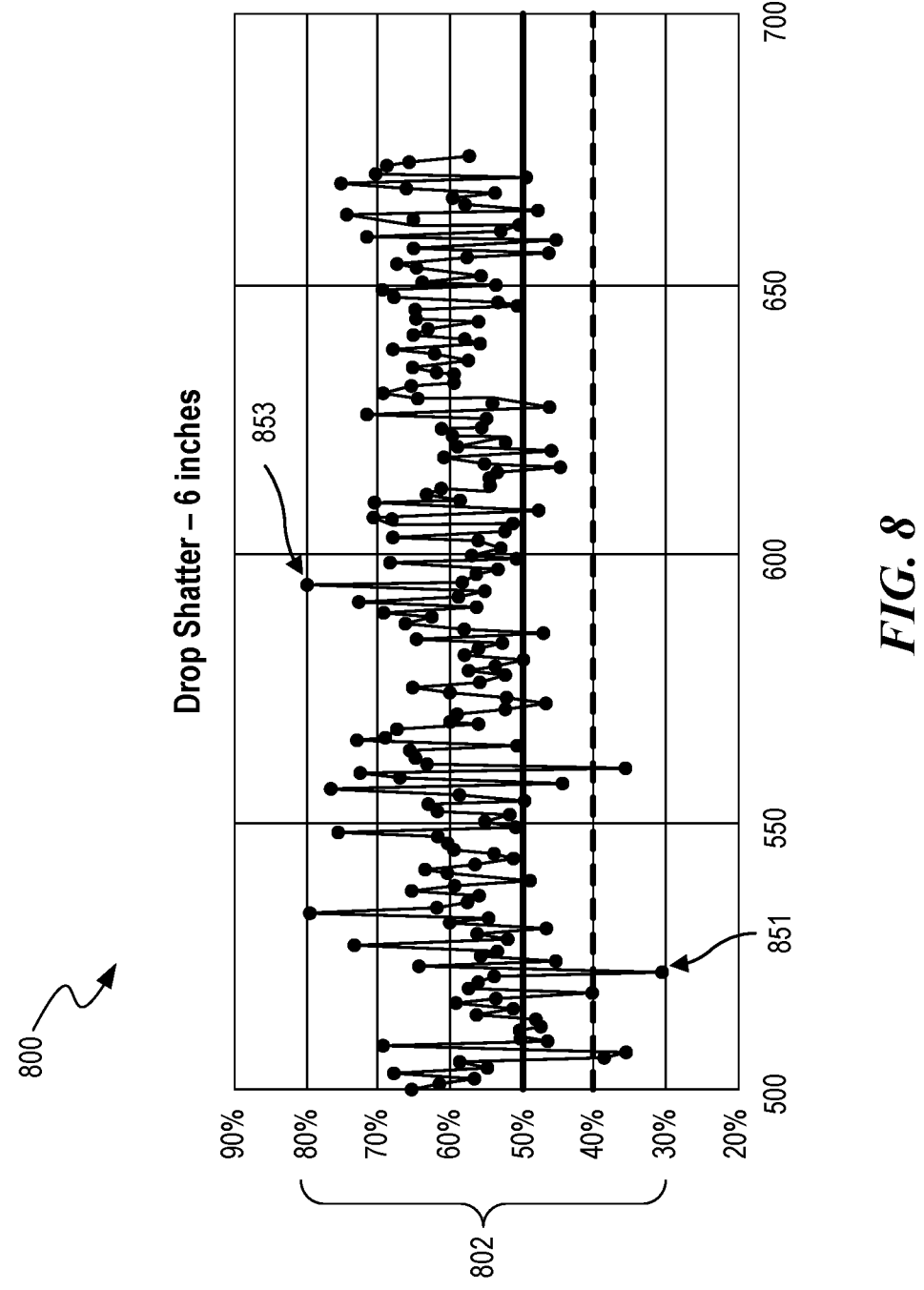
FIG. 8 is a chart indicating 6-inch drop shatter properties of foundry coke products, in accordance with embodiments of the present technology.

FIG. 8 is a chart 800 indicating 6-inch drop shatter properties, in accordance with embodiments of the present technology. As shown in the chart 800, the 6-inch drop shatter survival rates for different batches of coke products can range between approximately 30%, as illustrated by point 851, to approximately 80%, as illustrated by point 853. Embodiments of the present technology can implement operations that satisfy a minimum 6-inch drop shatter survival rate threshold, such as at least 60%, 70%, or 80%.

Figure 9:
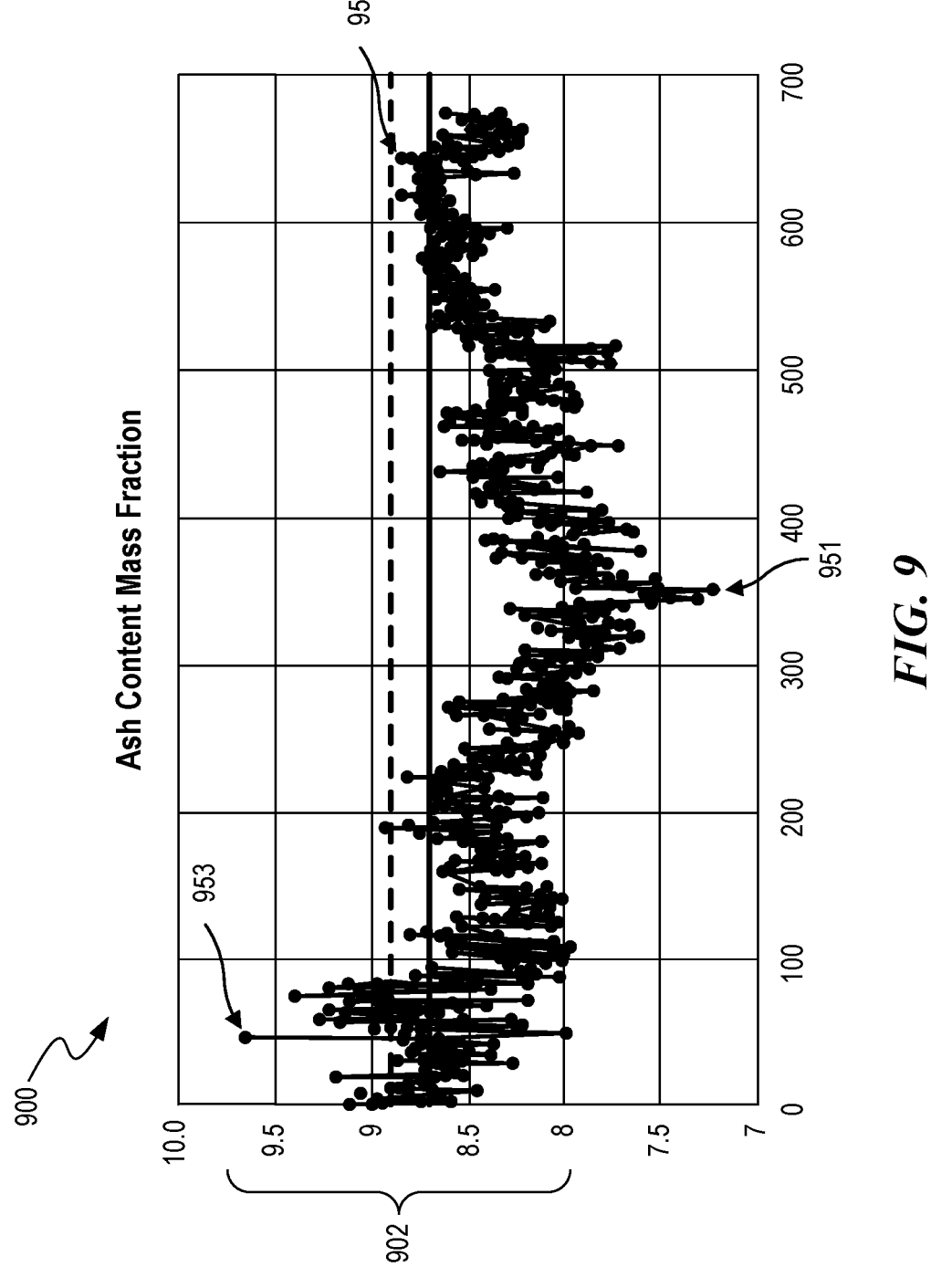
FIG. 9 is a chart indicating an ash mass fraction of foundry coke products, in accordance with embodiments of the present technology.

FIG. 9 is a chart 900 indicating an ash mass fraction, in accordance with embodiments of the present technology. As shown in the chart 900, the ash mass fractions for different batches of coke products can range between approximately 7%, as illustrated by point 951, to approximately 10%, as illustrated by point 953. In some embodiments, an ash content of a coke product can be less than an ash mass fraction threshold of 10.0%, 9.0%, 8.5%, 8.0%, or 7.5%. Additionally or alternatively, some embodiments of the present technology can produce a coke product having an ash mass fraction threshold that satisfies an ash mass fraction threshold that is less than 10.0%, 9.0%, 8.5%, 8.0%, 7.5%, or 7.0%. Some embodiments can include ash within a range, such as between 6-12%, 7-11%, 7-10%, or 8-10%.

Figure 10:
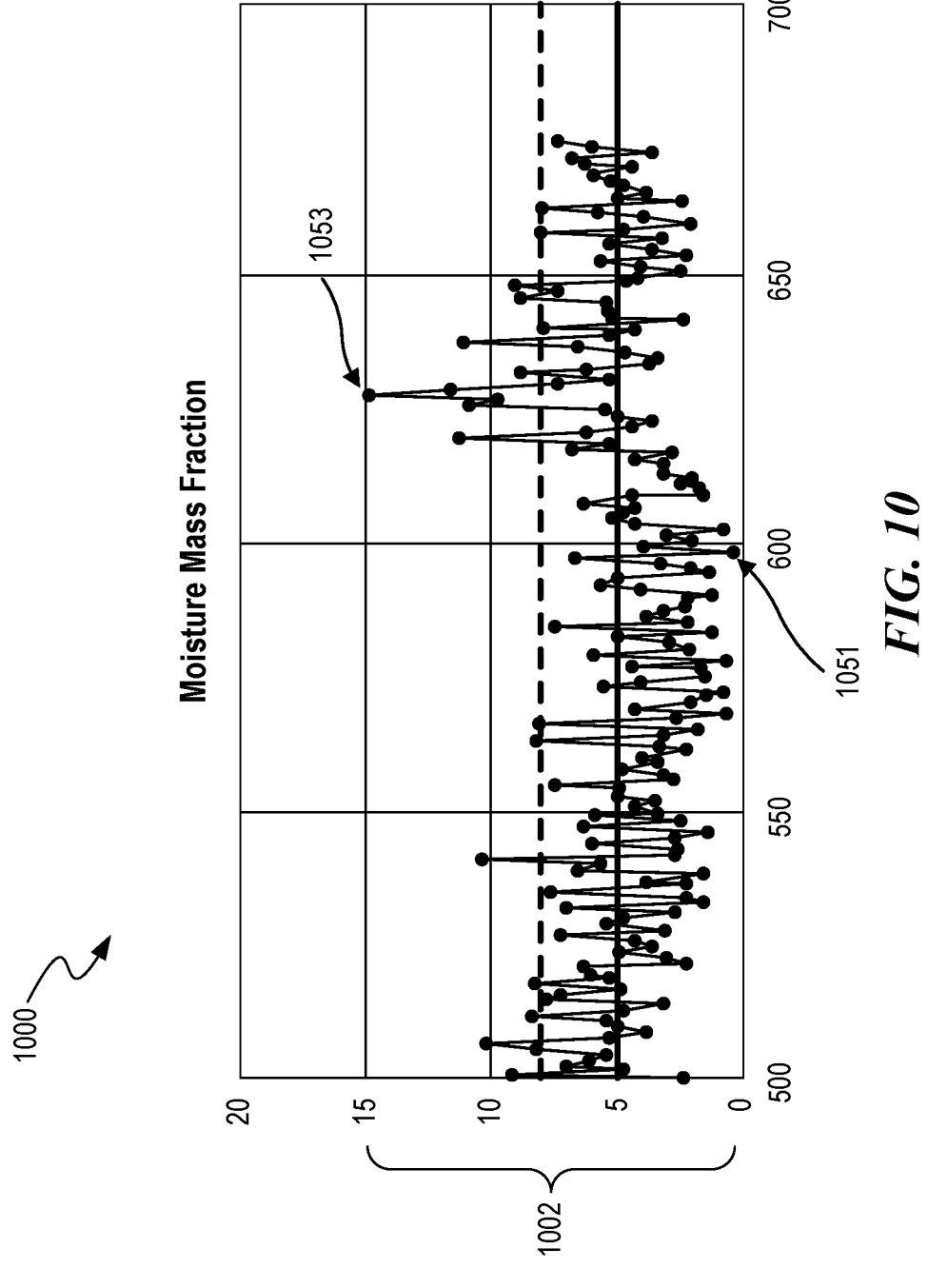
FIG. 10 is a chart indicating a moisture mass fraction of foundry coke products, in accordance with embodiments of the present technology.

FIG. 10 is a chart 1000 indicating a moisture mass fraction, in accordance with embodiments of the present technology. As shown in the chart 1000, the coke product moisture mass fractions for different batches of coke products can range between approximately 0%, as illustrated by point 1051, to approximately 15%, as illustrated by point 1053. In some embodiments, the moisture mass fraction can be no more than 5.0%, 4.0%, 3.0%, 2.0%, 1.0%, or 0.1%.

Figure 11:
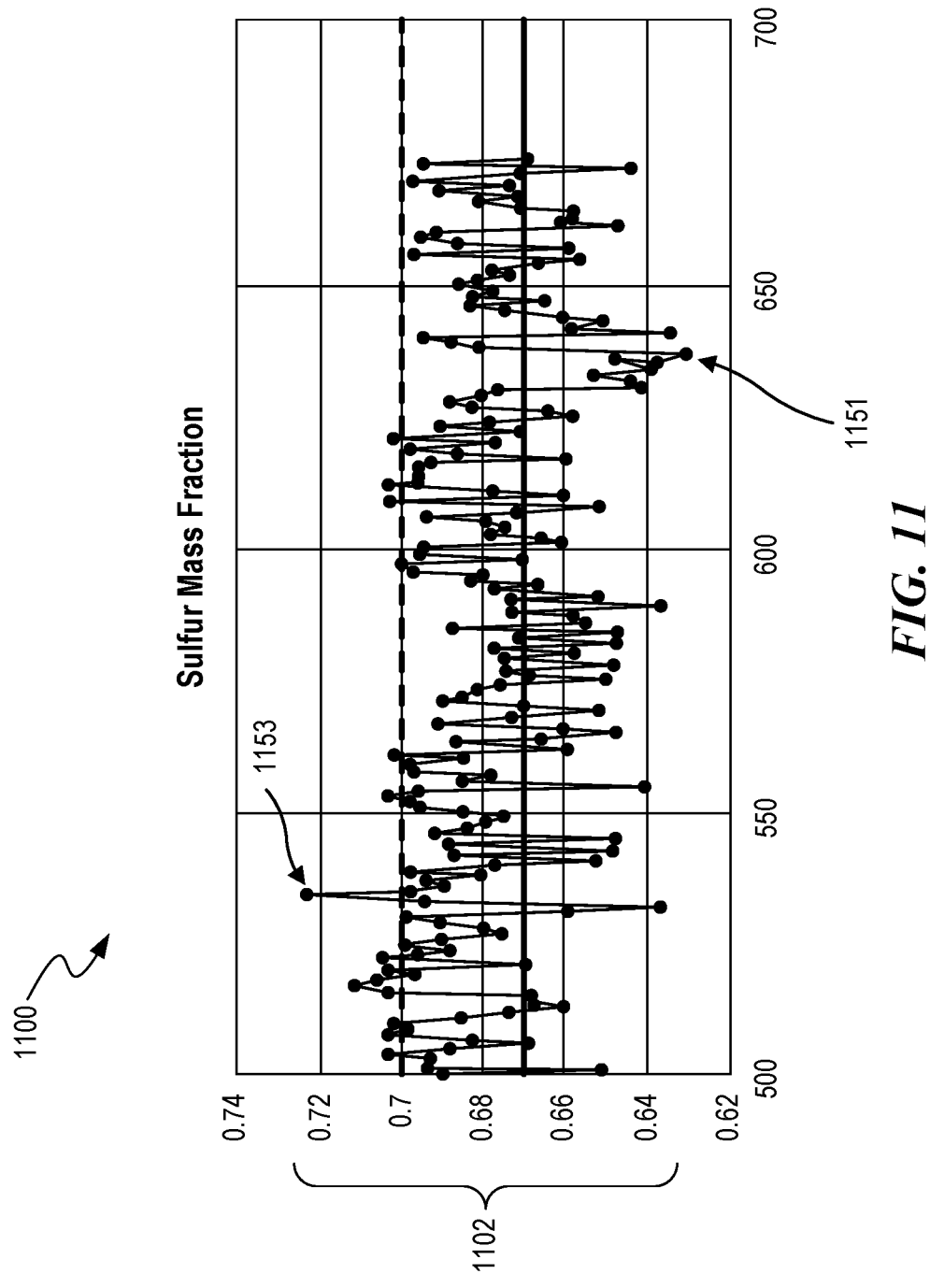
FIG. 11 is a chart indicating a sulfur mass fraction of foundry coke products, in accordance with embodiments of the present technology.

FIG. 11 is a chart 1100 indicating a sulfur mass fraction, in accordance with embodiments of the present technology. As shown in the chart 1100, the sulfur mass fractions for different batches of coke products can range between approximately 0.60%, as illustrated by point 1151, to approximately 0.75%, as illustrated by point 1153. In some embodiments, the sulfur mass fraction can be less than 0.8%, 0.7%, 0.65%, 0.5%, or 0.4%.

Figure 12:
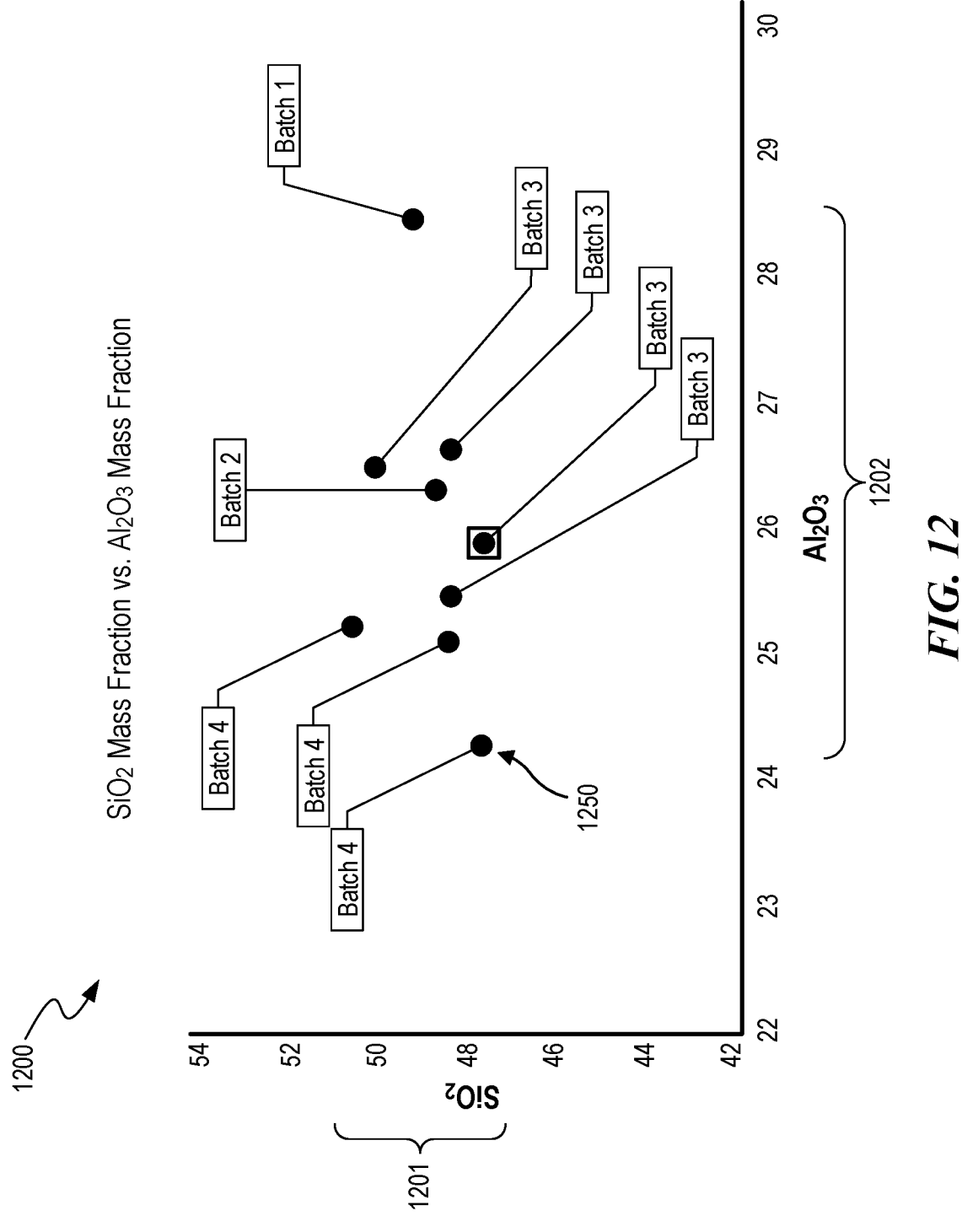
FIG. 12 is a chart depicting $SiO_2$ and $Al_2O_3$ mass fractions in the ash of foundry coke products, in accordance with embodiments of the present technology.

FIG. 12 is a chart 1200 depicting $SiO_2$ mass fractions and $Al_2O_3$ mass fractions in the ash of foundry coke products, in accordance with embodiments of the present technology. In some embodiments, a coke product can be characterized based on their mass fractions of $SiO_2$ and $Al_2O_3$ or ratios of these mass fractions. As shown in the chart 1200, different samples of coke ash can indicate different mass fractions or mass fraction ratios of $SiO_2$ and $Al_2O_3$. For example, point 1250 indicates a sample having an $SiO_2$ mass fraction of approximately 48.0% and an $Al_2O_3$ mass fraction of approximately 24.3%, which suggests that some ash of coke products can have a ratio of approximately 2:1 for a mass fraction ratio of $SiO_2$ to $Al_2O_3$. As indicated by the range 1201, the $SiO_2$ mass fractions of different samples can range between 48.0% and 51.0%. Furthermore, as indicated by the range 1202, the $Al_2O_3$ mass fractions of different samples can range between approximately 24.3% and 28.4% in some embodiments. In some embodiments, the coke products have a low amount of $Al_2O_3$ and $SiO_2$, such that the ash of the coke products have a combined $Al_2O_3$ mass fraction and $SiO_2$ mass fraction no more than 65%. By reducing the amount of Al and Si in a coke product, embodiments of the present technology can increase the efficiency of foundry operations by reducing their interference with carbon dissolution during foundry operations.

Some embodiments can produce a coke product or a coal blend used to produce the coal blend that satisfy other thresholds for $Al_2O_3$ or $SiO_2$. For example, some embodiments of the present technology can produce a coke product such that an $Al_2O_3$ mass fraction of the ash of the coke product, or an ash of a coal blend used to create the coke product, is less than or approximately 30%, 25%, or 20%. Additionally or alternatively, embodiments of the present technology can produce a coke product wherein an $SiO_2$ mass fraction of the ash of the coke product is no more than approximately 50%, 45%, 40%, or 35%. Additionally or alternatively, embodiments of the present technology can produce a coke product wherein a sum of a $SiO_2$ mass fraction and $Al_2O_3$ mass fraction of an ash of the coke product is no more than approximately 80%, 75%, 70%, or 65%.

Figure 13:
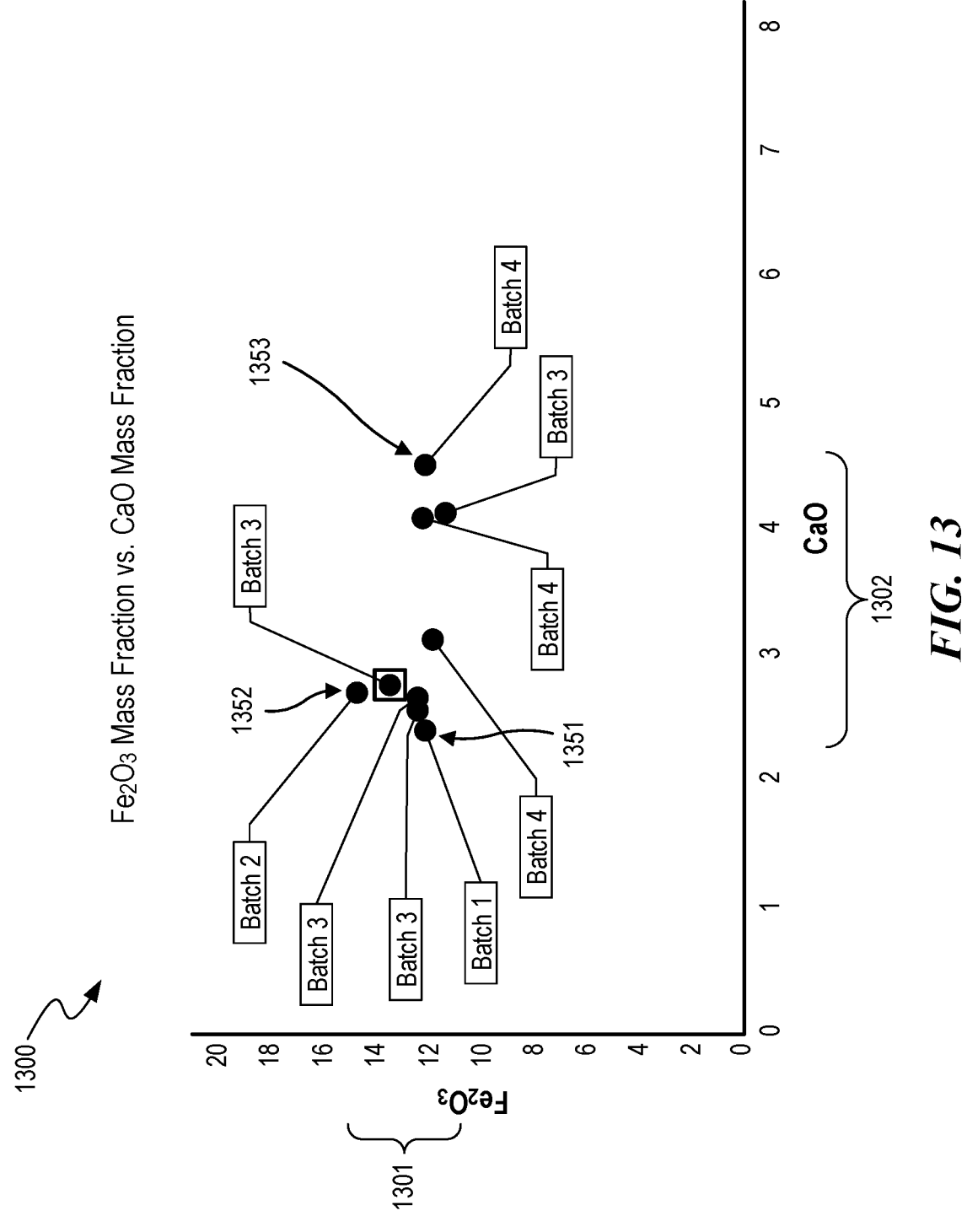
FIG. 13 is a chart depicting $Fe_2O_3$ and $CaO$ mass fractions in the ash of foundry coke products, in accordance with embodiments of the present technology.

FIG. 13 is a chart 1300 depicting Fe2O3 mass fractions and CaO mass fractions in the ash of foundry coke products, in accordance with embodiments of the present technology. In some embodiments, a coke product can be characterized based on their mass fractions of $Fe_2O_3$ and CaO or ratios of these mass fractions. As shown in the chart 1300, different data points representing coke ash samples can indicate different mass fractions and mass fraction ratios of $Fe_2O_3$ and CaO. For example, the point 1351 indicates a sample having an $Fe_2O_3$ mass fraction of approximately 12.1% and an CaO mass fraction of approximately 2.4%. Furthermore, the point 1352 indicates a sample having an $Fe_2O_3$ mass fraction of approximately 15.0% and an CaO mass fraction of approximately 2.8%. Furthermore, the point 1352 indicates a sample having an $Fe_2O_3$ mass fraction of approximately 12.0% and an CaO mass fraction of approximately 4.5%. Collectively, the points 1351 indicate that the mass fraction ratios of $Fe_2O_3$ and CaO for some samples can range between being approximately 5:1 to approximately 5:2 in some embodiments. Furthermore, as indicated by the range 1301, the $Fe_2O_3$ mass fractions of different samples can range between 11.0% and 15.0% in some embodiments. Furthermore, as indicated by the range 1302, the $Fe_2O_3$ mass fractions of CaO can range between 2.5% and 4.5% in some embodiments. In some embodiments, coke products have a CaO mass fraction of at least 10.0%, 9.0%, 8.0%, 7.0%, 6.0%, 5.0%, 4.0%, 3.0%, 2.0%, or 1.0%.

Figure 14:
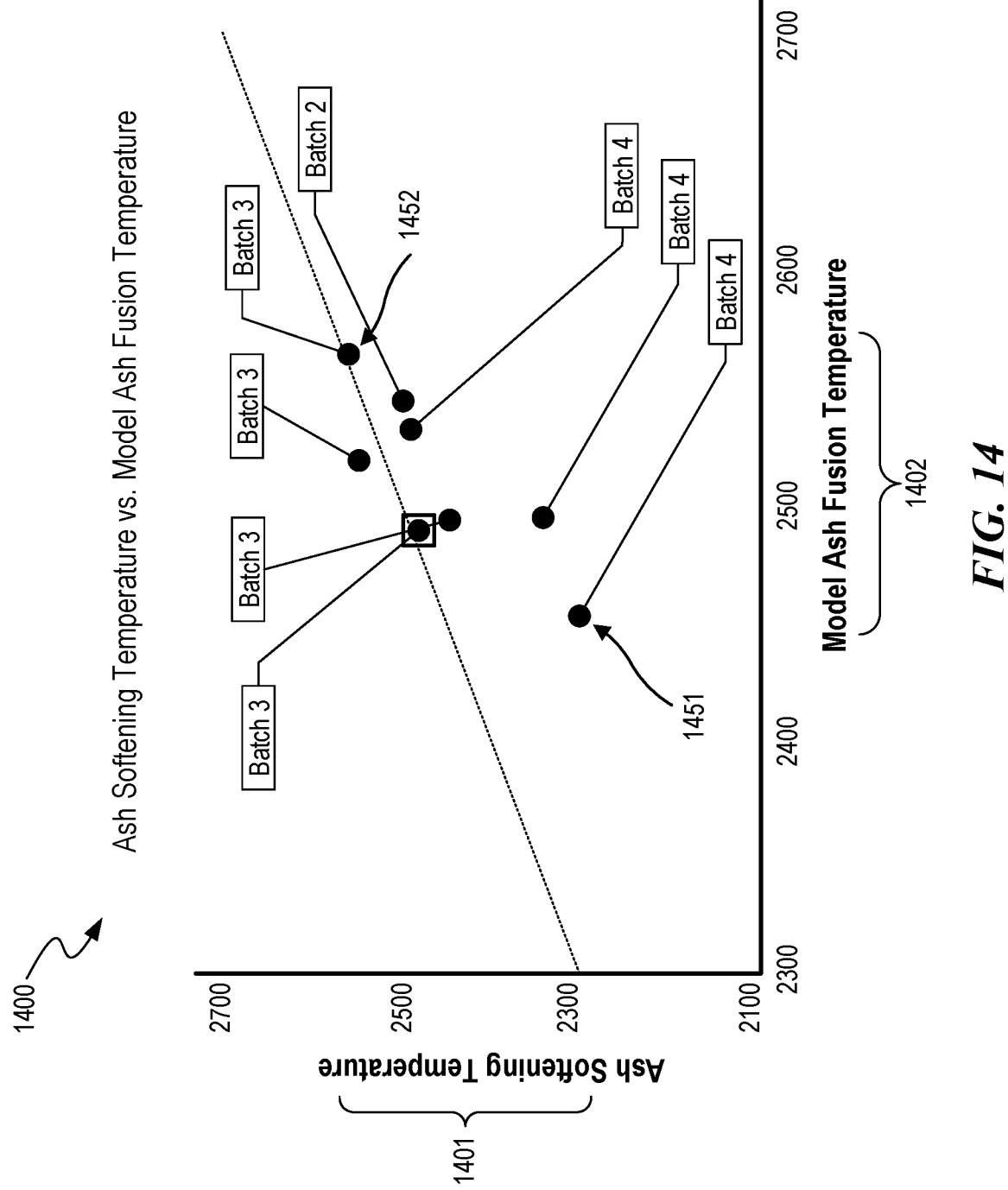
FIG. 14 is a chart depicting ash softening temperatures and model ash fusion temperatures of different batches of foundry coke products, in accordance with embodiments of the present technology.

FIG. 14 is a chart 1400 depicting Ash Softening Temperatures and Model Ash Fusion Temperatures of different batches of foundry coke products, in accordance with embodiments of the present technology. In some embodiments, a coke product can be characterized based on their ash ST values, model ash fusion temperature values, or ratios of these two values. As shown in the chart 1400, different samples of coke ash can have different ST and model ash fusion temperature values. For example, the point 1451 indicates a sample having an ash ST value equal to approximately 2300° F. and a model ash fusion temperature value equal to approximately 2460° F. Furthermore, the point 1452 indicates a sample having an ash ST value equal to approximately 2550° F. and a model ash fusion temperature value equal to approximately 2580° F. Furthermore, as indicated by a range 1401, the ash ST value of different samples can range between 2300° F. and 2600° F. in some embodiments. Furthermore, as indicated by a range 1402, the model ash fusion temperature values of some samples can range between 2450° F. and 2600° F. in some embodiments.

Figure 15:
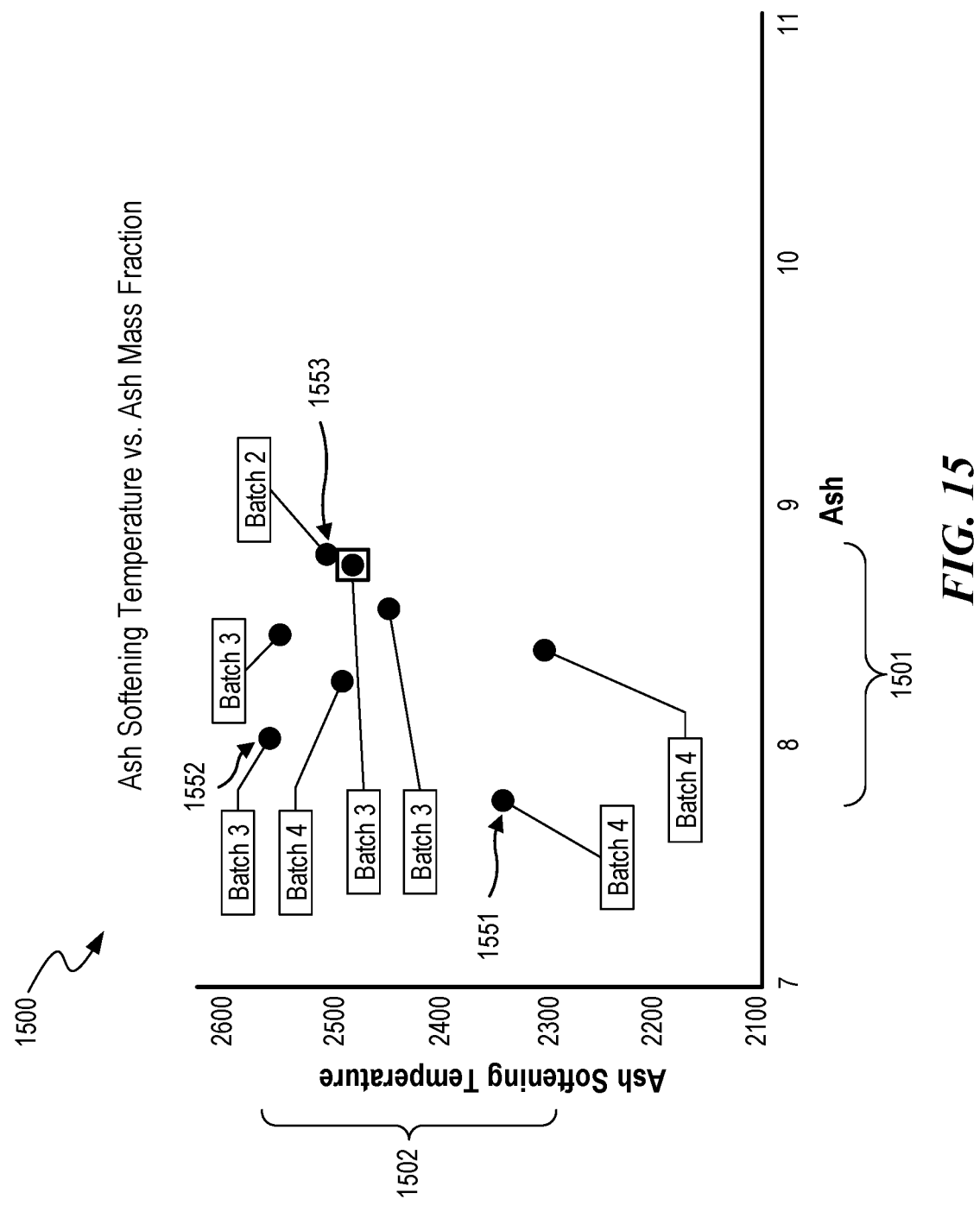
FIG. 15 is a chart depicting ash softening temperatures and ash mass fractions of different batches of foundry coke products, in accordance with embodiments of the present technology.

FIG. 15 is a chart 1500 depicting Ash Softening Temperatures and Ash Mass Fractions of different batches of foundry coke products, in accordance with embodiments of the present technology. In some embodiments, coke products can be characterized based on their ash mass fractions or observed ash ST values. As shown in the chart 1500, different samples of coke ash can indicate different ash mass fractions and observed STs for the different ash samples. For example, the point 1551 indicates a sample having an ST value equal to approximately 2350° F. and an ash mass fraction of approximately 7.8%. Furthermore, the point 1552 indicates a sample having an ST value equal to approximately 2560° F. and an ash mass fraction of approximately 8.1%. Furthermore, the point 2153 indicates a sample having an ST value equal to approximately 2500° F. and an ash mass fraction of approximately 8.8%. Some embodiments can produce coke products having lower ash content and lower ash fusion temperature than coke products using conventional coal blends or conventional operations. By reducing the ash of a coke product available to build up at a coke surface, some embodiments of the present technology can thus improve a carbon dissolution rate during a foundry operation. Similarly, by reducing an ash fusion temperature of a coke product, some embodiments of the present technology can improve an ash dissolution rate by reducing the temperature required to ash from a coke surface during a foundry operation.

In some embodiments, as indicated by the range 1501, the ash content values of different samples can range between 2300° F. and 2560° F. Furthermore, as indicated by the range 1502, the ash content can range between approximately 7.8% to 8.8%. As shown in the chart 1500, some embodiments of the present technology can produce a coke product having an ash mass fraction that is less than 10.0%, less than 9.0%, or less than another maximum ash mass fraction threshold. Furthermore, some embodiments of the present technology can perform operations to maintain a minimum amount of ash product. For example, some embodiments of the present technology can implement coke oven operations to produce coke products having at least 1.0% ash, 5.0% ash, 7.0% ash, etc.

Figure 16:
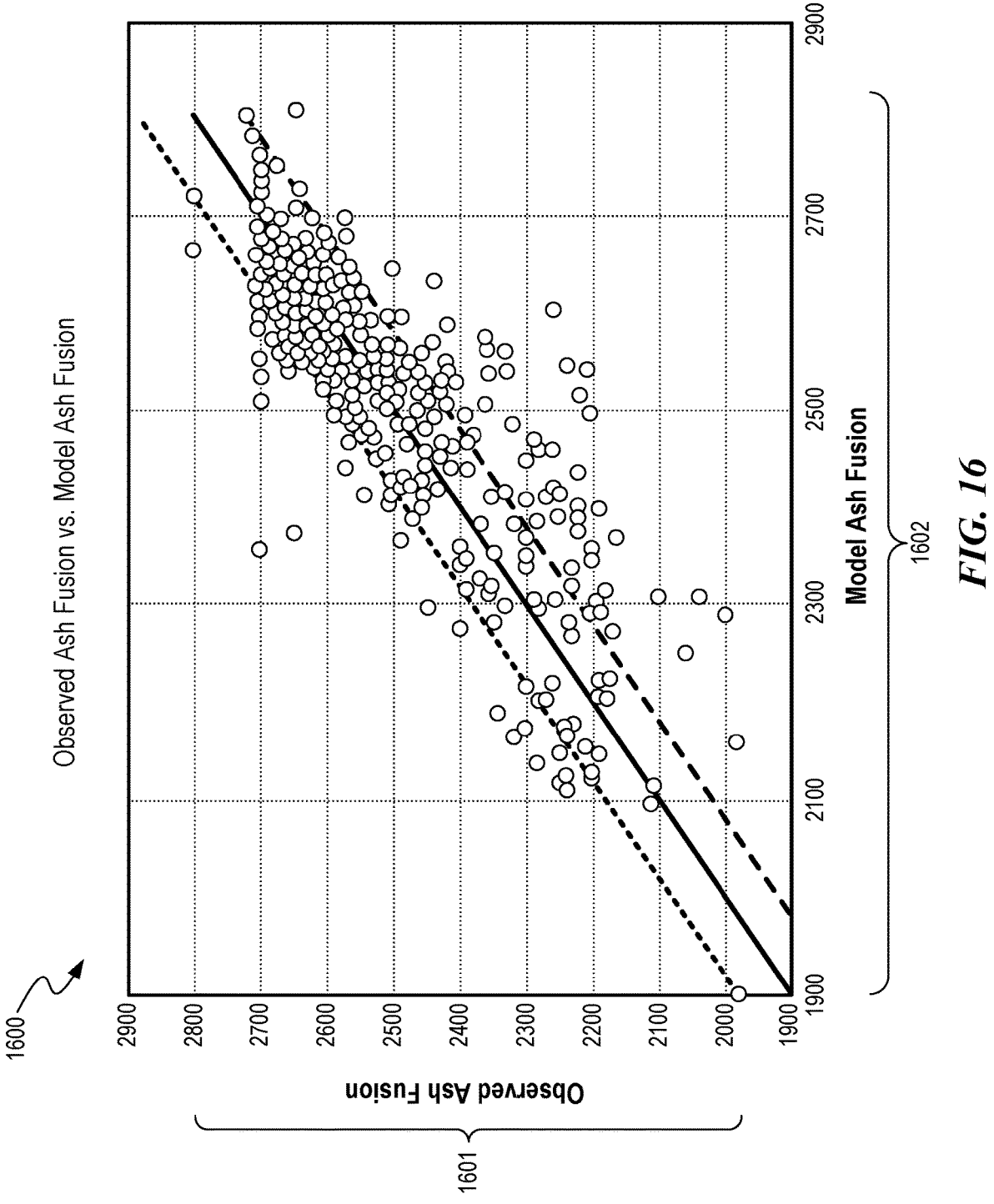
FIG. 16 is a chart depicting observed ash fusion temperatures and model ash fusion temperatures of different batches of foundry coke products, in accordance with embodiments of the present technology.

FIG. 16 is a chart 1600 depicting Observed Ash Fusion Temperatures vs. Model Ash Fusion Temperatures of different batches of foundry coke products, in accordance with one or more embodiments of the present technology. The chart 1600 includes a first range 1601, which indicates the range of observed ash fusion temperature values that range from approximately 1990-2800° F. The chart 1600 includes a second range, which indicates the range of model ash fusion temperature values that range between 1900-2750° F. As shown by the chart 1600, coke products can show an approximate direct correlation between model ash fusion temperature values and observed ash fusion temperature values.

IV. Conclusion

It will be apparent to those having skill in the art that changes may be made to the details of the above-described embodiments without departing from the underlying principles of the present technology. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. The term "comprising," "including," and "having" should be interpreted to mean including at least the recited feature(s) such that any greater number of the same feature and/or additional types of other features are not precluded. Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numbers expressing concentrations and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

The present technology is illustrated, for example, according to various aspects described below as numbered clauses or embodiments (1, 2, 3, etc.) for convenience. These are provided as examples and do not limit the present technology. It is noted that any of the dependent clauses can be combined in any combination, and placed into a respective independent clause.

1. A method for melting iron in a cupola furnace, the method comprising:
   receiving a population of coke products and iron in a cupola furnace, wherein the coke products comprise (i) an elongate shape including a length:width dimension of at least 1.5:1, (ii) an ash fusion temperature of no more than 2450° F., and/or (iii) a coke reactivity index (CRI) of at least 30%; and
   melting the iron in the cupola furnace to form molten iron having a carbon content higher than a carbon content of the received iron.

2. The method of any one of the clauses herein, wherein the coke products comprise a fixed carbon content, and wherein at least 40% of the fixed carbon content is transferred to the molten iron in the cupola.

3. The method of any one of the clauses herein, wherein the coke products comprise a fixed carbon content, the method further comprising oxidizing the coke products in a lower reactivity region of the cupola to produce carbon monoxide, wherein no more than 40% of the fixed carbon content is released via the produced carbon monoxide.

4. The method of any one of the clauses herein, wherein the coke products comprise a fixed carbon content of at least 85%, the method further comprising oxidizing the coke products in a lower reactivity region of the cupola to produce carbon monoxide, wherein no more than 50 lbs/hour of the produced carbon monoxide is released from an upper area of the cupola.

5. The method of any one of the clauses herein, wherein melting the iron comprises melting the iron at a melting rate of at least 22 tons/hour and such that a metal tap temperature of the molten iron is at least 2680° F.

6. The method of any one of the clauses herein, wherein the cupola comprises an upper drying region, and a lower reaction region downstream of the upper drying region, and wherein the coke products comprise a composition configured to inhibit Boudouard reactions of the coke products within the upper drying region and/or promote oxidation reactions of the coke products within the lower reactivity region.

7. The method of any one of the clauses herein, wherein the cupola comprises an upper drying region, and a lower reaction region downstream of the upper drying region, and wherein the method further comprises (i) drying the coke products in the upper drying region, (ii) oxidizing the coke products in the lower reactivity region to produce carbon monoxide, and (iii) combusting the coke products in the lower reactivity region to produce carbon dioxide.

8. The method of clause 7, wherein drying the coke products comprises shrinking a core of individual coke products and forming a diffusion layer comprising ash or iron, wherein the diffusion layer is radially outward of the core and, in operation, inhibits Boudouard reactions within the cupola at the upper drying region.

9. The method of clause 7, wherein oxidizing the coke products comprises shrinking a core of individual coke products and forming (i) a first diffusion layer comprising ash that is radially outward of the core and (ii) a second diffusion layer comprising iron that is radially outward of the core and/or first diffusion layer, wherein, in operation, the first diffusion layer and/or the second diffusion layer inhibits Boudouard reactions within the cupola at the upper drying region.

10. The method of any one of the clauses herein, wherein the ash fusion temperature is no more than 2200° F.

11. The method of any one of the clauses herein, wherein the CRI of the coke products is between 35-45%.

12. The method of any one of the clauses herein, wherein the length:width ratio of at least some of the individual coke products is at least 2:1.

13. The method of any one of the clauses herein, wherein at least some of the individual coke products have a length of at least 8 inches and a width of at least 4 inches.

14. The method of any one of the clauses herein, wherein the coke products have an ash content of 6.0-12.0%.

15. The method of any one of the clauses herein, wherein the coke products have a fixed carbon content of at least 90.0%.

16. The method of any one of the clauses herein, wherein the coke products have a sulfur content of no more than 0.7 wt %.

17. The method of any one of the clauses herein, wherein the coke products have a 2-inch drop shatter of at least 90.0% and/or a 4-inch drop shatter of at least 78%.

18. A system for melting iron, the system comprising:
a cupola furnace including a refractory-lined elongate furnace body configured to support coke and iron, and a wind box configured to provide a source of oxygen to the furnace body, wherein the furnace body includes (i) an inlet opening configured to receive the coke and iron, (ii) an outlet configured to provide molten iron; a drying region, and (iii) a reaction region downstream of the drying region, wherein, in operation, the cupola furnace is configured to melt the iron to form, at the outlet of the furnace body, the molten iron having a carbon content higher than a carbon content of the received iron; and
a population of coke products disposed within the furnace body at the drying region and the reaction region, wherein individual coke products comprise (i) an elongate shape including a length:width dimension of at least 1.5:1, (ii) an ash fusion temperature no more than 2400° F., and (iii) a coke reactivity index (CRI) of at least 30%.

19. The system of any one of the clauses herein, wherein, in operation, the cupola (i) dries the coke products in the drying region, (ii) oxidizes the coke products in the reactivity region to produce carbon monoxide, and (iii) combusts the coke products in the reactivity region to produce carbon dioxide.

20. The system of clause 19, wherein oxidizing the coke products comprises shrinking a core of individual coke products and forming a diffusion layer comprising ash or iron, and wherein the diffusion layer is radially outward of the core and, in operation, inhibits Boudouard reactions within the cupola at the upper drying region.

21. The method of clause 19, wherein oxidizing the coke products comprises shrinking a core of individual coke products and forming (i) a first diffusion layer comprising ash that is radially outward of the core and (ii) a second diffusion layer comprising iron that is radially outward of the core and first diffusion layer, wherein, in operation, the first diffusion layer and the second diffusion layer inhibits Boudouard reactions within the cupola at the upper drying region.

22. The system of any one of the clauses herein, wherein the ash fusion temperature is no more than 2200° F.

23. The system of any one of the clauses herein, wherein the CRI of the coke products is between 35-45%.

24. The system of any one of the clauses herein, wherein the length:width ratio of at least some of the individual coke products is at least 2:1.

25. The system of any one of the clauses herein, wherein at least some of the individual coke products have a length of 8 inches and a width of 4 inches.

26. The system of any one of the clauses herein, wherein the coke products have an ash content of 7.0-9.0%.

27. The method of any one of the clauses herein, wherein the coke products have a 2-inch drop shatter of at least 90.0% and/or a 4-inch drop shatter of at least 78%.

We claim:
1. A system for melting iron, the system comprising:
a cupola furnace including a refractory-lined elongate furnace body configured to support coke and iron, and a wind box configured to provide a source of oxygen to the furnace body, wherein the furnace body includes (i) an inlet opening configured to receive the coke and iron, (ii) an outlet configured to provide molten iron; a drying region, and (iii) a reaction region downstream of the drying region, wherein, in operation, the cupola furnace is configured to melt the iron to form, at the outlet of the furnace body, the molten iron having a carbon content higher than a carbon content of the received iron; and a population of coke products disposed within the furnace body at the drying region and the reaction region, wherein individual coke products comprise (i) an elongate shape including a length:width dimension of at least 1.5:1, (ii) an ash fusion temperature no more than 2400° F., and (iii) a coke reactivity index (CRI) of at least 30%.

2. The system of claim 1, wherein, in operation, the cupola (i) dries the coke products in the drying region, (ii) oxidizes the coke products in the reactivity region to produce carbon monoxide, and (iii) combusts the coke products in the reactivity region to produce carbon dioxide.

3. The system of claim 2, wherein oxidizing the coke products comprises shrinking a core of individual coke products and forming a diffusion layer comprising ash or iron, and wherein the diffusion layer is radially outward of the core and, in operation, inhibits Boudouard reactions within the cupola at the upper drying region.

4. The system of claim 2, wherein oxidizing the coke products comprises shrinking a core of individual coke products and forming (i) a first diffusion layer comprising ash that is radially outward of the core and (ii) a second diffusion layer comprising iron that is radially outward of the core and first diffusion layer, wherein, in operation, the first diffusion layer and the second diffusion layer inhibits Boudouard reactions within the cupola at the upper drying region.

5. The system of claim 1, wherein the ash fusion temperature is no more than 2200° F.

6. The system of claim 1, wherein the CRI of the coke products is between 35-45%.

7. The system of claim 1, wherein the length:width ratio of at least some of the individual coke products is at least 2:1.

8. The system of claim 1, wherein at least some of the individual coke products have a length of 8 inches and a width of 4 inches.

9. The system of claim 1, wherein the coke products have an ash content of 7.0-9.0%.

10. The system of claim 1, wherein the coke products have a porosity of at least 20%.

11. A system for melting iron, the system comprising:

a cupola furnace including a refractory-lined elongate furnace body configured to support coke and iron, and a wind box configured to provide a source of oxygen to the furnace body, wherein the furnace body includes (i) an inlet opening configured to receive the coke and iron, (ii) an outlet configured to provide molten iron; a drying region, and (iii) a reaction region downstream of the drying region; and a population of coke products disposed within the furnace body at the drying region and the reaction region, wherein individual coke products comprise (i) an elongate shape including a length:width dimension of at least 1.5:1, (ii) an ash fusion temperature no more than 2600° F., and/or (iii) a coke reactivity index (CRI) of at least 30%.

12. The system of claim 11, wherein, in operation, the cupola furnace is configured to melt the iron to form, at the outlet of the furnace body, the molten iron having a carbon content higher than a carbon content of the received iron.

13. The system of claim 11, wherein at least some of the individual coke products comprise (i) an elongate shape including a length:width dimension of at least 1.5:1 and (ii) an ash fusion temperature no more than 2400° F.

14. The system of claim 13, wherein at least some of the individual coke products comprise a coke reactivity index (CRI) of at least 30%.

15. The system of claim 11, wherein at least some of the individual coke products have a length of 8 inches and a width of 4 inches.

16. The system of claim 11, wherein the coke products have an ash content of 7.0-9.0%.

17. The system of claim 11, wherein the coke products have a porosity of at least 20%.

* * * * *